United States Patent
Wada

(10) Patent No.: US 10,547,992 B2
(45) Date of Patent: Jan. 28, 2020

(54) COMMUNICATION APPARATUS, METHOD OF CONTROLLING A COMMUNICATION APPARATUS, AND STORAGE MEDIUM

(71) Applicant: CANON KABUSHIKI KAISHA, Tokyo (JP)

(72) Inventor: Tomoko Wada, Kasukabe (JP)

(73) Assignee: Canon Kabushiki Kaisha, Tokyo (JP)

(*) Notice: Subject to any disclaimer, the term of this patent is extended or adjusted under 35 U.S.C. 154(b) by 159 days.

(21) Appl. No.: 14/980,746

(22) Filed: Dec. 28, 2015

(65) Prior Publication Data
US 2016/0198498 A1    Jul. 7, 2016

(30) Foreign Application Priority Data
Jan. 5, 2015   (JP) .................. 2015-000510

(51) Int. Cl.
| | | |
|---|---|---|
| *H04W 4/80* | (2018.01) | |
| *H04W 88/08* | (2009.01) | |
| *H04W 84/12* | (2009.01) | |

(52) U.S. Cl.
CPC .............. *H04W 4/80* (2018.02); *H04W 84/12* (2013.01); *H04W 88/08* (2013.01)

(58) Field of Classification Search
CPC ... H04W 4/008; H04W 76/027; H04W 84/12; H04W 84/18; H04W 4/80; H04W 88/08; H04W 72/027; H04W 72/18; H04W 76/18
See application file for complete search history.

(56) References Cited

U.S. PATENT DOCUMENTS

| | | | | |
|---|---|---|---|---|
| 8,941,869 B2* | 1/2015 | Kida | ............... | G06F 3/1296 |
| | | | | 358/1.14 |
| 9,405,498 B2* | 8/2016 | Nishi | ............... | H04W 76/15 |
| 9,521,271 B2* | 12/2016 | Lee | ............... | G06F 3/1204 |
| 9,712,955 B2* | 7/2017 | Terashita | ............... | H04W 4/008 |
| 9,800,762 B2* | 10/2017 | Yamada | ............... | H04W 76/14 |
| 9,832,327 B2* | 11/2017 | Asakura | ............... | G06F 3/12 |
| 2010/0188695 A1 | 7/2010 | Okigami | ............... | 358/1.15 |
| 2011/0268051 A1* | 11/2011 | Tsao | ............... | H04W 4/008 |
| | | | | 370/329 |
| 2016/0050551 A1* | 2/2016 | Qi | ............... | H04W 8/005 |
| | | | | 455/434 |
| 2017/0223579 A1* | 8/2017 | Lee | ............... | H04W 36/0022 |
| | | | | 709/228 |

FOREIGN PATENT DOCUMENTS

JP       2010-177947       8/2010

* cited by examiner

*Primary Examiner* — Khaled M Kassim
*Assistant Examiner* — Thomas R Cairns
(74) *Attorney, Agent, or Firm* — Venable LLP

(57) ABSTRACT

A communication apparatus operable as an AP of a wireless LAN, the apparatus comprises a transmission unit configured to transmit to another apparatus an instruction for causing a connection to a wireless LAN that the AP creates; a reception unit configured to receive from the other apparatus, which received the instruction by communication in accordance with BLE (Bluetooth Low Energy), a notification indicating that it is possible to connect to the wireless LAN that the AP creates; and an activation unit configured to activate a function of the AP in accordance with reception by the reception unit without activating a function of the AP in accordance with the transmission of the instruction by the transmission unit.

10 Claims, 16 Drawing Sheets

COMMUNICATION APPARATUS, METHOD OF CONTROLLING A COMMUNICATION APPARATUS, AND STORAGE MEDIUM

BACKGROUND OF THE INVENTION

Field of the Invention

The present invention relates to a communication apparatus, a method of controlling a communication apparatus, and a storage medium.

Description of the Related Art

In recent years, in a communication apparatus as typified by a smart phone, a tethering function in which the smart phone itself, by operating as an access point (hereinafter, an AP), functions as a modem for another communication apparatus, is widely supported.

If the tethering function of the smart phone is used, it is possible, even for a device that only has a wireless LAN communication function, to use public network communication of the smart phone to communicate with an external server.

Japanese Patent Laid-Open No. 2010-177947 discloses a technique in which, if a smart phone is caused to approach a printer, the printer transmits identification data about wireless LAN communication to the smart phone by Bluetooth (registered trademark), and the identification data is used for both parties to perform wireless LAN communication.

In the Near Field Communication (hereinafter, NFC) Forum, a protocol in which a handover from NFC to a different wireless communication method such as wireless LAN or Bluetooth is being standardized.

In a conventional technique in which a smart phone and a printer perform a handover by an NFC touch and perform wireless LAN communication, a case in which the smart phone connects as an AP and the printer connects as a station (hereinafter, STA) is considered.

There is a necessity for the printer to connect as the STA to the smart phone, but there is a possibility that the printer is already performing wireless LAN communication as an AP of another communication apparatus. In such a case, the printer cannot connect to the AP of the smart phone in a state that maintains the wireless LAN communication with the other communication apparatus. To avoid this, a method in which the smart phone is caused to operate in advance as the AP and wait for a connection by the printer has been considered.

However, because the smart phone does not know when the printer will connect, there is a need for it to continuously operate as the AP, and power is significantly consumed. In addition, because the printer cannot determine whether the smart phone is operating as the AP, it is possible that the printer is performing unnecessary connection processing. Correspondingly, power or wireless resources are consumed unnecessarily.

The present invention was conceived in view of the above described problems, and provides a technique of reducing unnecessary connection processing between communication apparatuses.

SUMMARY OF THE INVENTION

According to one aspect of the present invention, there is provided a communication apparatus operable as an AP of a wireless LAN, the apparatus comprising: a transmission unit configured to transmit to another apparatus an instruction for causing a connection to a wireless LAN that the AP creates; a reception unit configured to receive from the other apparatus, which received the instruction by communication in accordance with BLE (Bluetooth Low Energy), a notification indicating that it is possible to connect to the wireless LAN that the AP creates; and an activation unit configured to activate a function of the AP in accordance with reception by the reception unit without activating a function of the AP in accordance with the transmission of the instruction by the transmission unit.

Further features of the present invention will become apparent from the following description of exemplary embodiments with reference to the attached drawings.

BRIEF DESCRIPTION OF THE DRAWINGS

FIG. 6A-1, 6A-2 to FIG. 6C are flowcharts illustrating a procedure of cooperative processing that the communication apparatus (the smart phone) performs with the external communication apparatus (the printer) according to an embodiment of the present invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<1. Configuration of Communication System>

Figure 1:
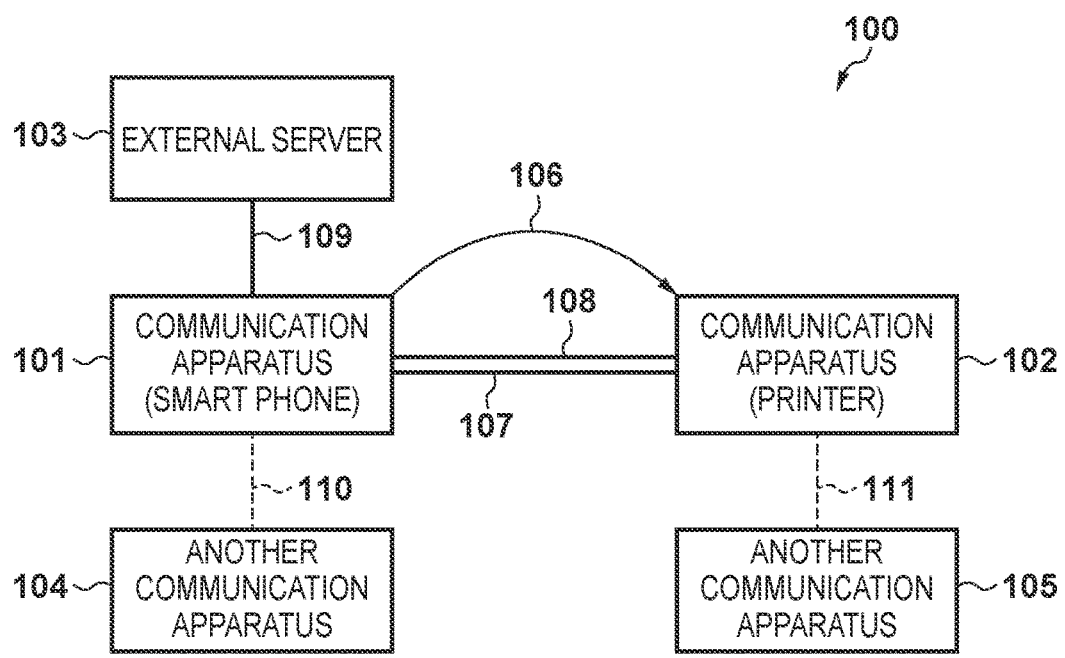
FIG. 1 is a view for illustrating an example configuration of a communication system according to an embodiment of the present invention.

FIG. 1 is a view for illustrating an example configuration of a communication system 100 according to an embodiment of the present invention. The reference numeral 101 denotes a communication apparatus, which is a smart phone in an embodiment of the present invention. The reference numeral 102 denotes an external communication apparatus, which is a printer in an embodiment of the present invention.

The smart phone 101 and the printer 102 can communicate with each other by using an NFC communication 106, a Bluetooth Low Energy (hereinafter, BLE) communication 107, and a wireless LAN communication 108.

The smart phone 101 can use a public wireless communication 109 to communicate with an external server 103. Also, the smart phone 101 can use a wireless LAN communication 110 to communicate with another communication apparatus 104. Similarly the printer 102 can use a wireless LAN communication 111 to communicate with another communication apparatus 105.

<2. Hardware Configuration of Communication Apparatuses and External Communication Apparatus>

Figure 2:
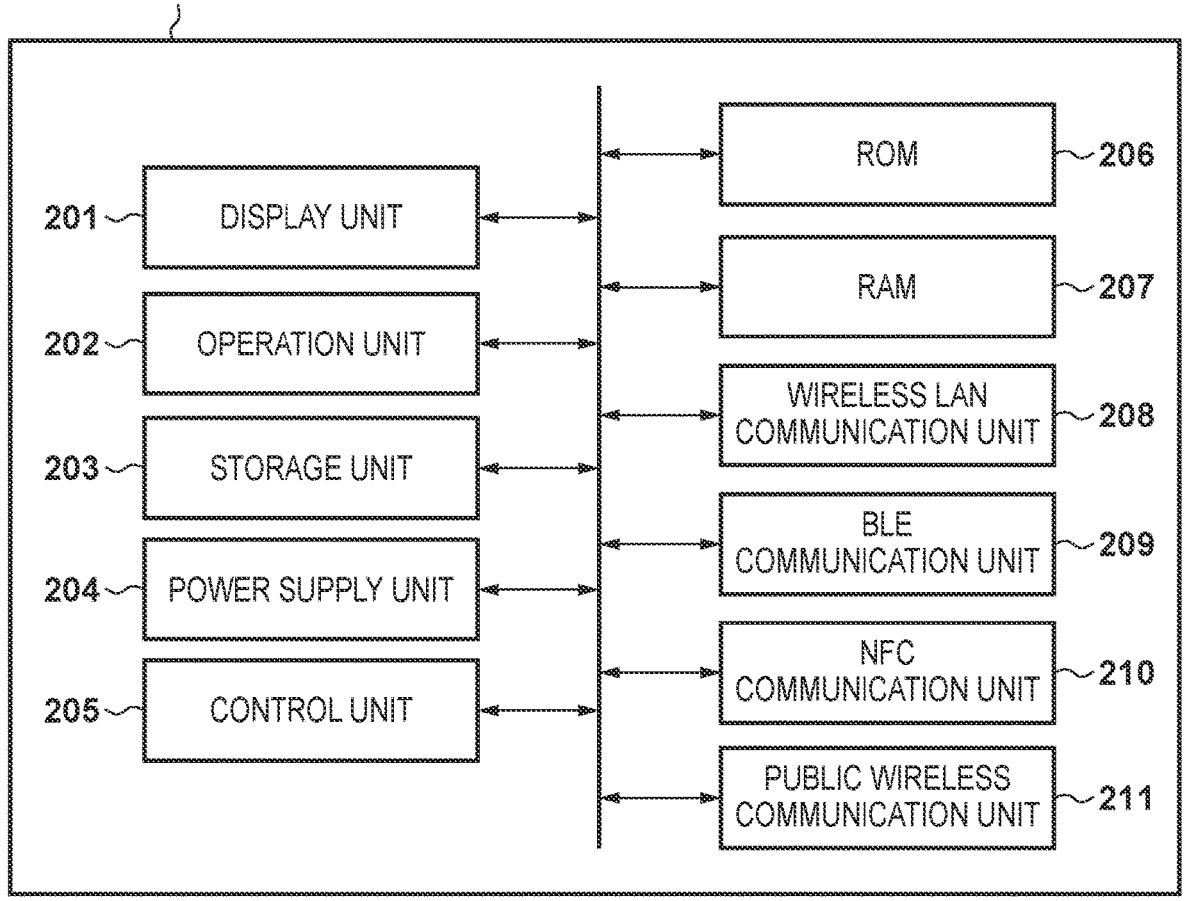
FIG. 2 is a view for illustrating an example of a hardware configuration of a communication apparatus (a smart phone) according to an embodiment of the present invention.

Next, with reference to FIG. 2, explanation is given of a hardware configuration of the smart phone 101 according to an embodiment of the present invention. The smart phone 101 is equipped with a display unit 201, an operation unit 202, a storage unit 203, a power supply unit 204, a control unit 205, a ROM 206, a RAM 207, a wireless LAN communication unit 208, a BLE communication unit 209, an NFC communication unit 210, and a public wireless communication unit 211.

Note that the smart phone 101 is one example of a communication apparatus according to the present embodiment, which may be an apparatus other than a smart phone. The NFC communication unit, the wireless LAN communication unit, and the BLE communication unit are respectively examples of a first communication unit, a second communication unit, and a third communication unit that the communication apparatus is provided with, and these may be communication units that perform wireless communication methods other than NFC, wireless LAN, or BLE.

The display unit 201 is for example comprised by an LCD (Liquid Crystal Display) or an LED (Light Emitting Diode), has a function of outputting information that is recognizable visually, and displays a UI (User Interface) that corresponds to an application.

The operation unit 202 has a function for operating the smart phone 101 by accepting various input or the like from a user. The storage unit 203, for example, is comprised by an HDD (Hard Disk Drive), and stores and manages various data, such as wireless communication network information, data transmission/reception information and image data. The power supply unit 204 is, for example, a battery, which stores a power supply for operating the apparatus on the whole, and supplies power to each piece of hardware.

The control unit 205 is for example a CPU (Central Processing Unit), and controls operation of each component of the smart phone 101. The ROM 206 stores control instructions, that is a program, and various later-described operations are realized by the control unit 205 executing a control program stored in the ROM 206. The RAM 207 is used for a work memory when executing a program, a temporary storage for data, or the like.

The wireless LAN communication unit 208 performs the wireless LAN communication 108. The wireless LAN communication unit 208 performs a wireless communication in compliance with an IEEE 802.11 series. The BLE communication unit 209 performs the BLE communication 107. The BLE communication unit 209 performs BLE RF control, BLE communication processing, control of a driver that performs various control of BLE communication, or protocol processing in relation to BLE communication.

The NFC communication unit 210 performs the NFC communication 106. The NFC communication unit 210 performs a wireless communication in compliance with NFC. Upon detecting an apparatus in a communication range in which communication is possible, the NFC communication unit 210 automatically establishes the NFC communication 106. Note that the NFC communication unit 210 performs a wireless communication in compliance with NFC, but may use a communication scheme for which a communication range is shorter than in communication schemes used by the wireless LAN communication unit 208 and the BLE communication unit 209. In addition, the NFC communication unit 210 may use a communication scheme for which a communication rate is slower than that for communication schemes used by the wireless LAN communication unit 208 and the BLE communication unit 209.

The public wireless communication unit 211 performs the public wireless communication 109. The public wireless communication unit 211 performs RF control of the public wireless communication, public wireless communication processing for performing the public wireless communication, control of a driver that performs various control of the public wireless communication, or protocol processing in relation to the public wireless communication. The public wireless communication is, for example, communication in compliance with an IMT (International Multimedia Telecommunications) standard, an LTE (Long Term Evolution) standard, or the like.

Figure 3:
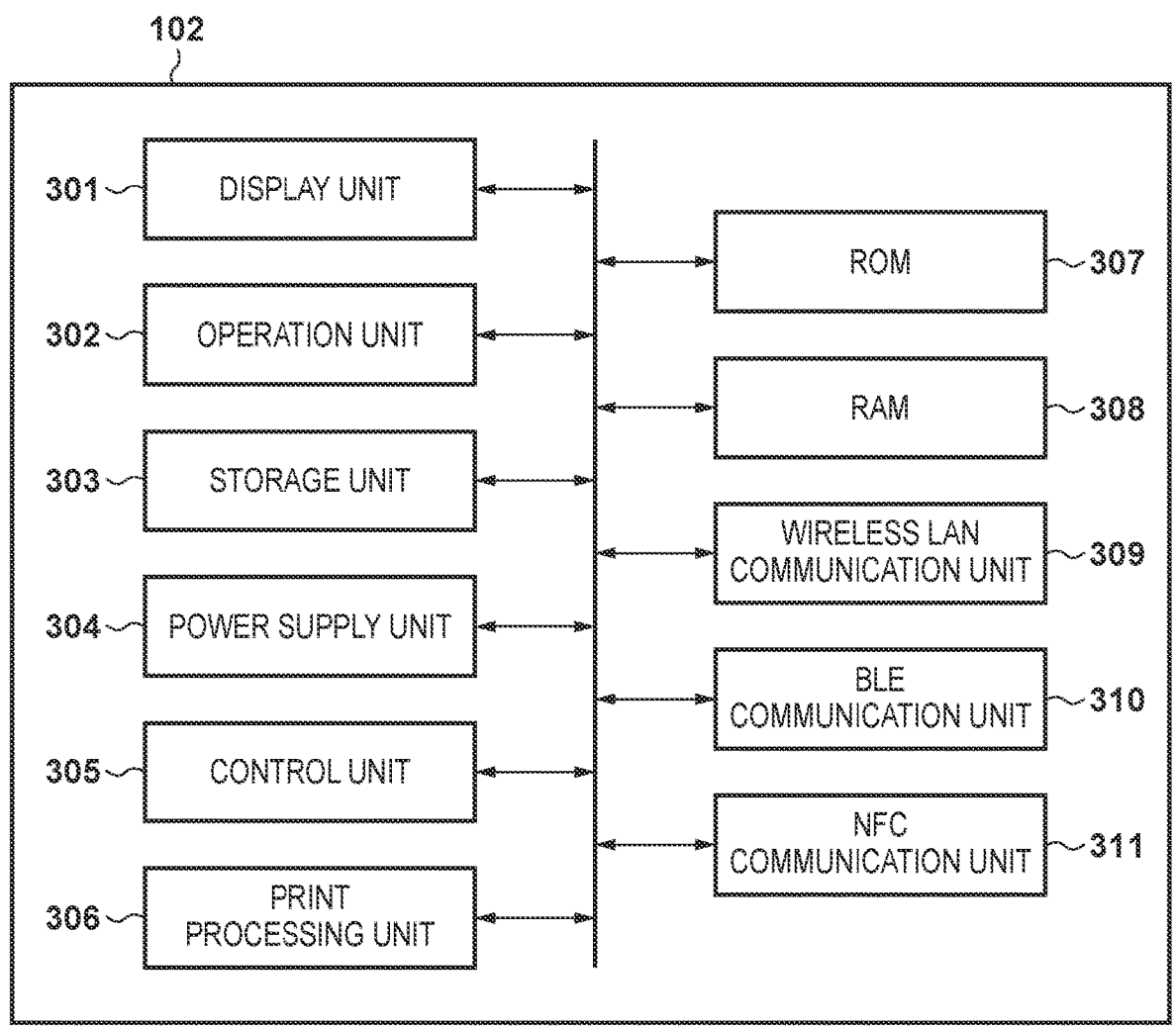
FIG. 3 is a view for illustrating an example of a hardware configuration of an external communication apparatus (a printer) according to an embodiment of the present invention.

Next, with reference to FIG. 3, explanation is given of a hardware configuration of the printer 102 according to an embodiment of the present invention. The printer 102 is provided with a display unit 301, an operation unit 302, a storage unit 303, a power supply unit 304, a control unit 305, a print processing unit 306, a ROM 307, a RAM 308, a wireless LAN communication unit 309, a BLE communication unit 310, and an NFC communication unit 311.

Note that the printer 102 is one example of an external communication apparatus according to the present embodiment, which may be an apparatus other than a printer. Also, the NFC communication unit, the wireless LAN communication unit, and the BLE communication unit are respectively examples of a first communication unit, a second communication unit, and a third communication unit that the communication apparatus is provided with, and these may be communication units that perform wireless communication methods other than NFC, wireless LAN, or BLE.

The printer 102 is provided with the print processing unit 306 in place of the public wireless communication unit 211 of the smart phone 101. The print processing unit 306 prints image data stored in the storage unit 303. Because other components are the same as corresponding components of the smart phone 101, explanation thereof is omitted.

<3. Functional Block Configuration of Communication Apparatuses and External Communication Apparatus>

Figure 4:
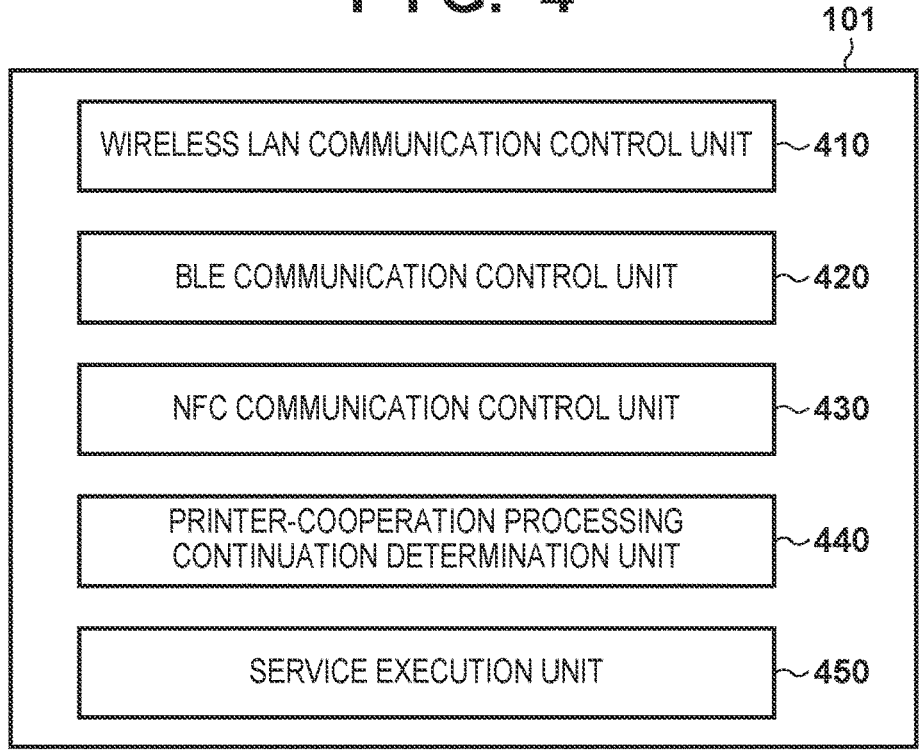
FIG. 4 is a functional block diagram of the communication apparatus (the smart phone) according to an embodiment of the present invention.
Figure 5:
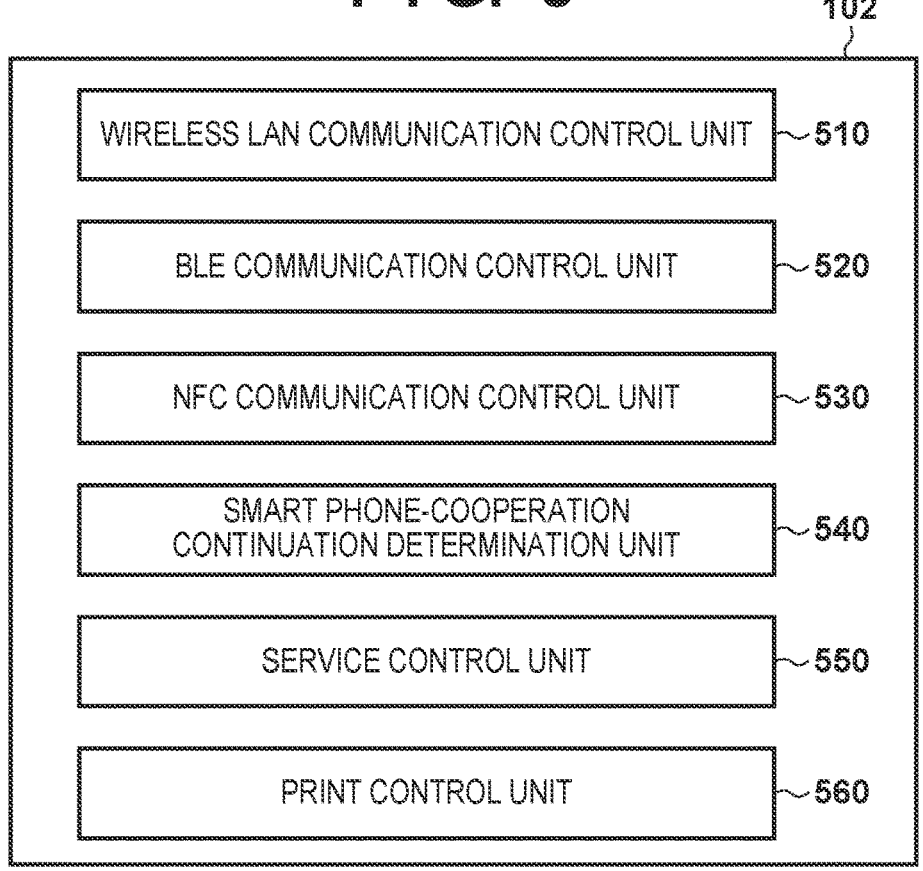
FIG. 5 is a functional block diagram of the external communication apparatus (the printer) according to an embodiment of the present invention.

Next, with reference to FIG. 4 and FIG. 5, explanation is given of functional block diagrams of the smart phone 101 and the printer 102.

In the present embodiment, the functional blocks of the smart phone 101 and the printer 102 are stored as programs in the ROM 206 and the ROM 307 respectively, and functions thereof are performed by the control unit 205 and the control unit 305 respectively executing the programs. In accordance with the control programs, the control units 205 and 305 realize each function by performing control of respective pieces of the hardware and processing or computation of information.

Note that all or a portion of the present functional blocks may be implemented in hardware. In such a case, all or a portion of respective functional blocks may be comprised by, for example, an ASIC (application specific integrated circuit).

Firstly, FIG. 4 is a functional block diagram of the smart phone 101 according to an embodiment of the present invention. The smart phone 101 is equipped with a wireless LAN communication control unit 410, a BLE communication control unit 420, an NFC communication control unit 430, a printer-cooperation processing continuation determination unit 440, and a service execution unit 450.

The wireless LAN communication control unit 410 controls the wireless LAN communication via the wireless LAN communication unit 208. In addition, the wireless LAN communication control unit 410 is provided with an AP function that operates as an access point, and an STA function that operates as a terminal of the wireless LAN.

The BLE communication control unit 420 controls BLE communication via the BLE communication unit 209. The NFC communication control unit 430 controls NFC communication via the NFC communication unit 210. The printer-cooperation processing continuation determination unit 440 determines continuation of printer-cooperation processing.

The service execution unit 450 manages service information of an external communication apparatus that can be executed by the smart phone 101 using the wireless LAN communication control unit 410, and executes services. The service execution unit 450 manages, as the service information, identifiers of services, and execution procedures of services that correspond thereto, option information of services, or the like. Note that the smart phone 101 of the present embodiment can execute two types of services: a "print service" and a "remote maintenance service".

Next, FIG. 5 is a functional block diagram of the printer 102 according to an embodiment of the present invention. The printer 102 is equipped with a wireless LAN communication control unit 510, a BLE communication control unit 520, an NFC communication control unit 530, a smart phone-cooperation continuation determination unit 540, a service control unit 550, and a print control unit 560.

The wireless LAN communication control unit 510 controls the wireless LAN communication via the wireless LAN communication unit 309. In addition, the wireless LAN communication control unit 510 is provided with an AP function that operates as an access point, and an STA function that operates as a terminal of the wireless LAN.

The BLE communication control unit 520 controls BLE communication via the BLE communication unit 310. The NFC communication control unit 530 controls NFC communication via the NFC communication unit 311. The smart phone-cooperation continuation determination unit 540 determines continuation of smart phone-cooperation processing.

The service control unit 550 manages information of a service that the printer 102 can provide to an opposing device via the wireless LAN communication control unit 510, and executes services. The service control unit 550 manages, as the service information, identifiers of services, and execution procedures of services that correspond thereto, option information of services, or the like. Note that the printer 102 of the present embodiment can execute two types of services: a "print service" and a "remote maintenance service".

The print control unit 560 controls print processing by the print processing unit 306. The service control unit 550 controls the print control unit 560 in accordance with a request from an opposing device, and prints image data received from the opposing device.

<4. Operation Example of Smart Phone 101>

Next, explanation is given for an example of operation of the communication system 100 according to an embodiment of the present invention. Explanation is given below for an operational procedure of the smart phone 101 according to the present embodiment, with reference to the flowcharts of FIG. 6A-1, 6A-2, FIG. 6B, FIG. 6C, and screen images of FIG. 9, FIGS. 10A-10E, FIGS. 11A-11D, and FIG. 12.

Figures 1, 6A:
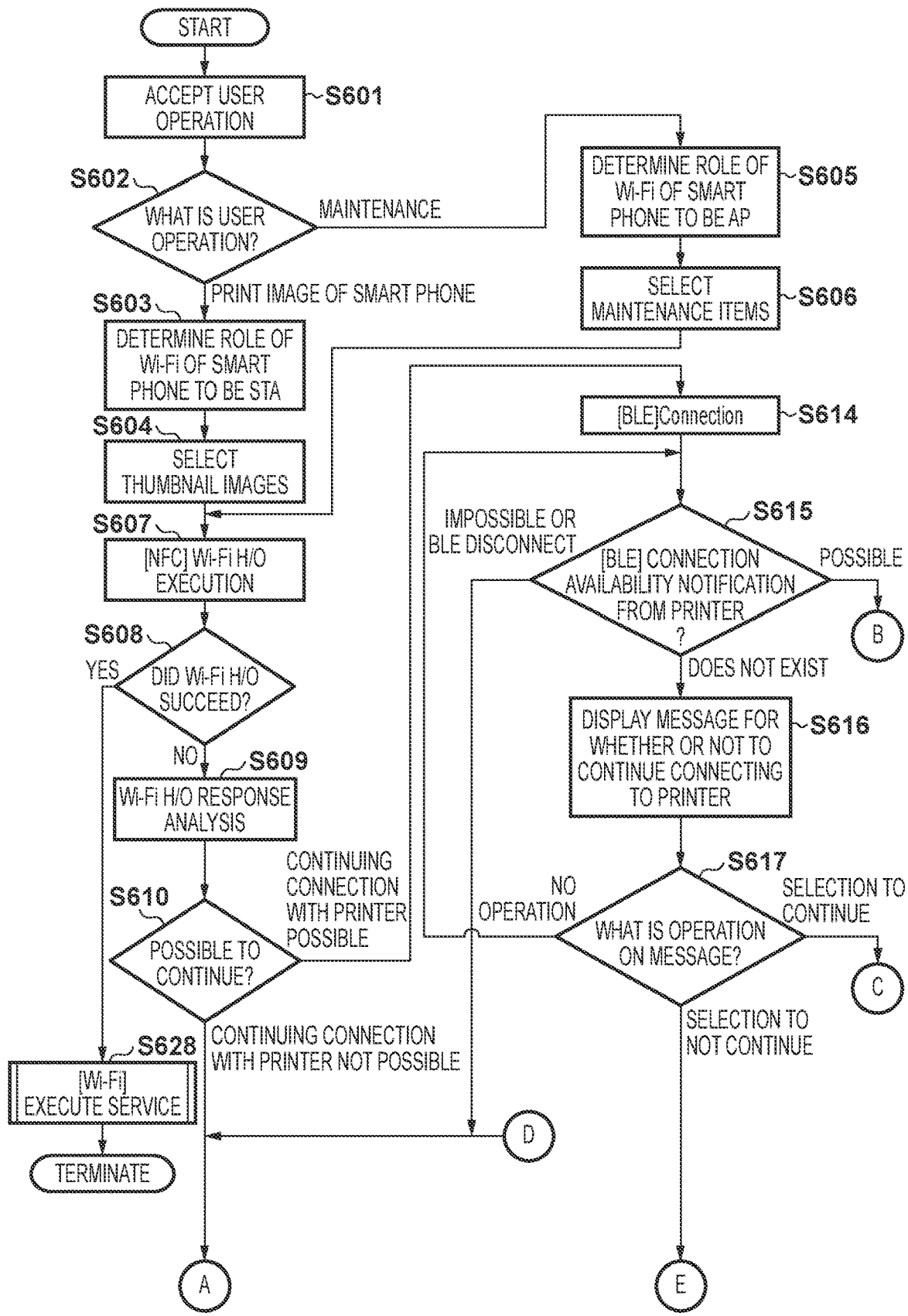
Figures 2, 6A:
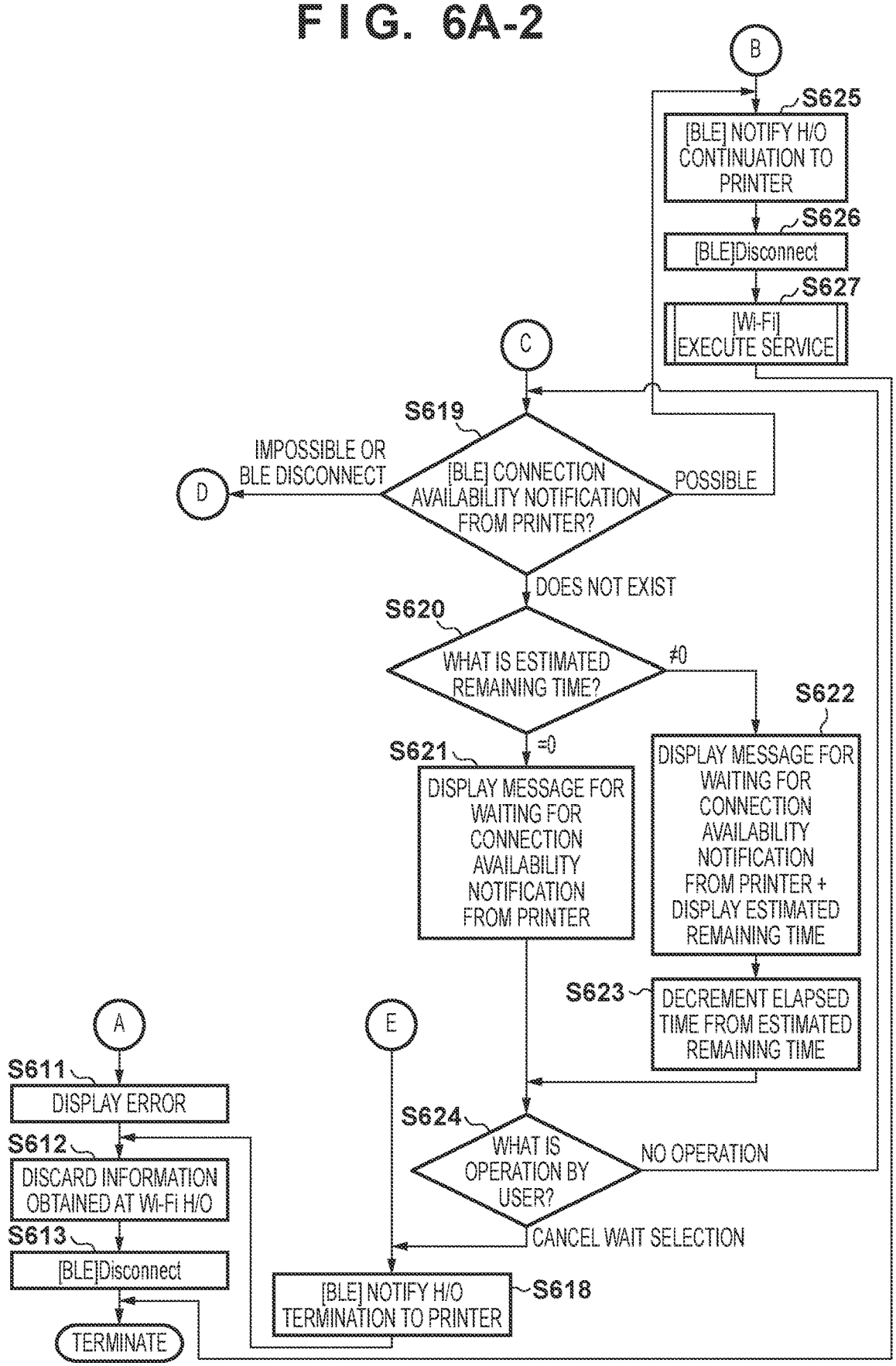

The flowcharts of FIG. 6A-1, 6A-2 to FIG. 6C illustrate an operational procedure for when the smart phone 101 performs the printer-cooperation processing. In the present embodiment, processing of FIG. 6A-1, 6A-2 is started in the smart phone 101 in accordance with activation of an application for cooperation with the printer.

Figure 9:
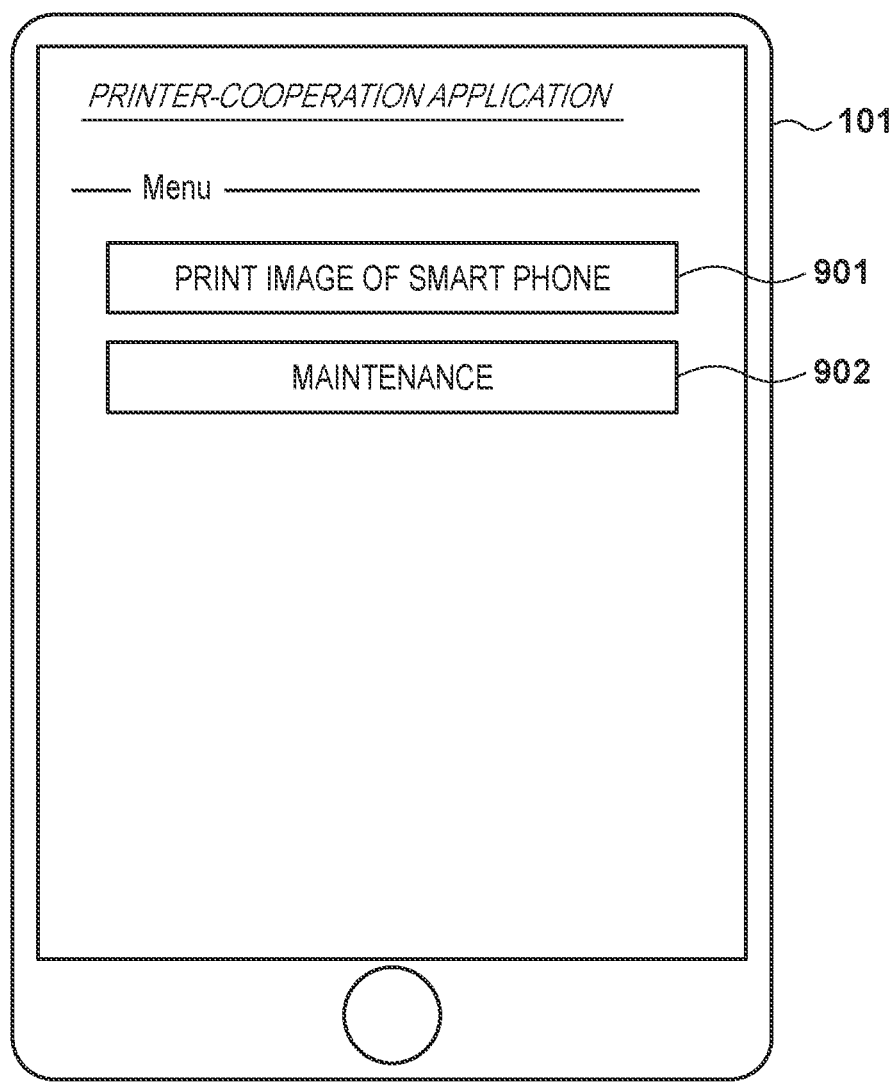
FIG. 9 is a screen image view for a printer-cooperation application of the communication apparatus (the smart phone) according to an embodiment of the present invention.
Figure 10A:
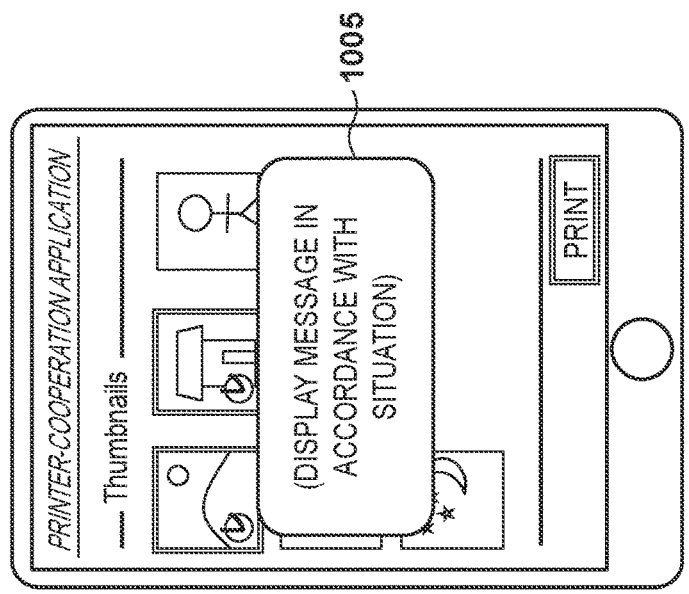
FIG. 10A to FIG. 10E are screen transition image views of a print service of the printer-cooperation processing of the communication apparatus (the smart phone) according to an embodiment of the present invention.
Figure 10B:
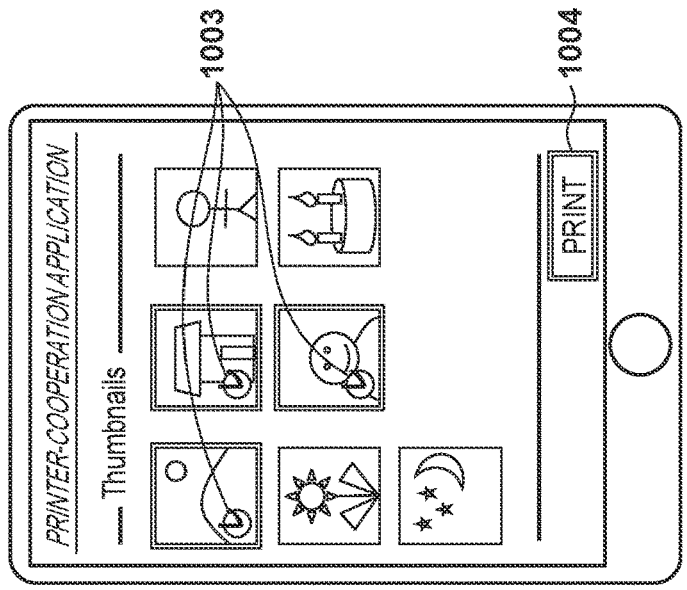
Figure 10C:
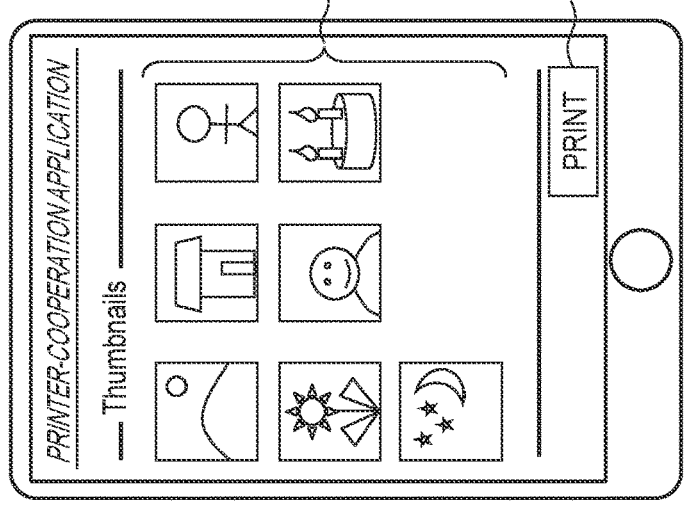
Figure 10D:
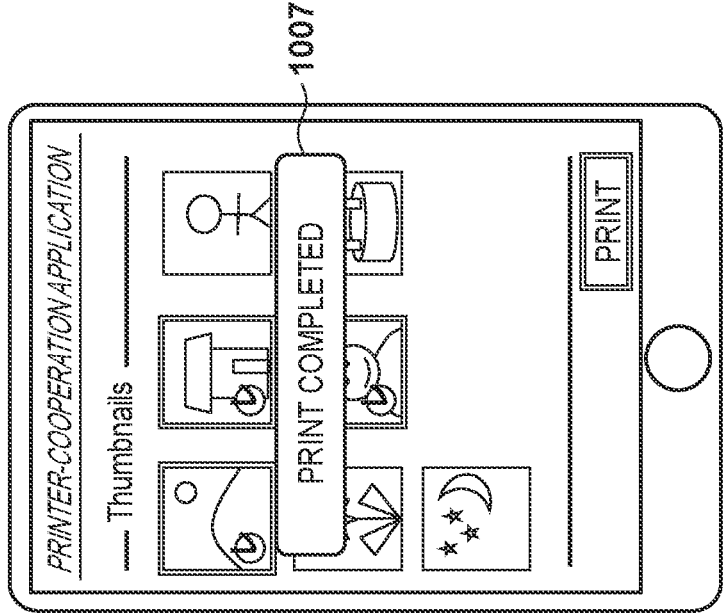
Figure 10E:
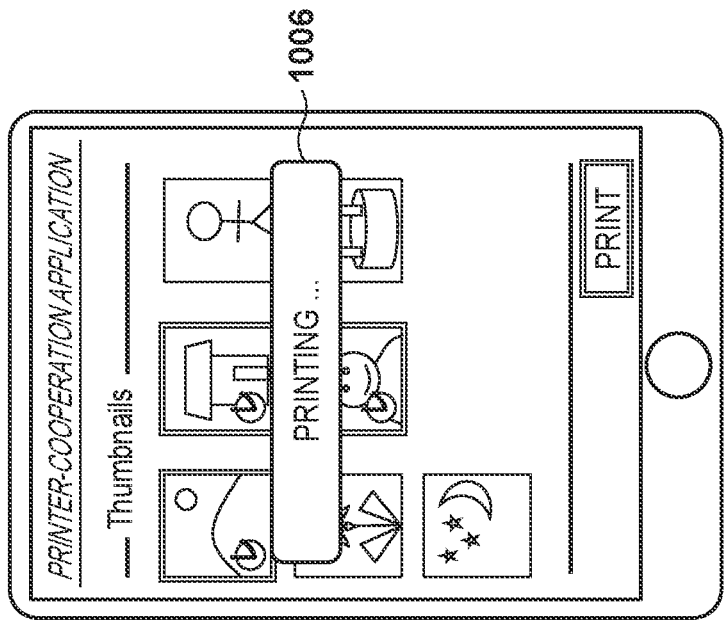
Figure 11A:
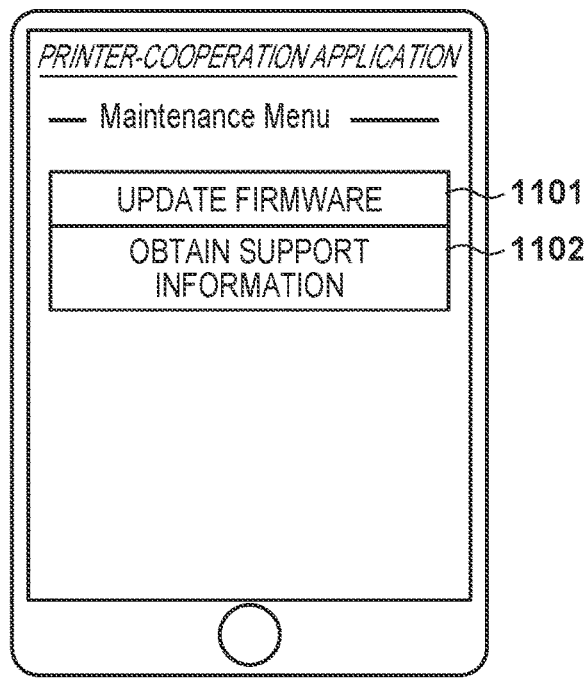
FIG. 11A to FIG. 11D are views for illustrating an examples of screen transitions of a remote maintenance service of the printer-cooperation processing of the communication apparatus (the smart phone) according to an embodiment of the present invention.
Figure 11C:
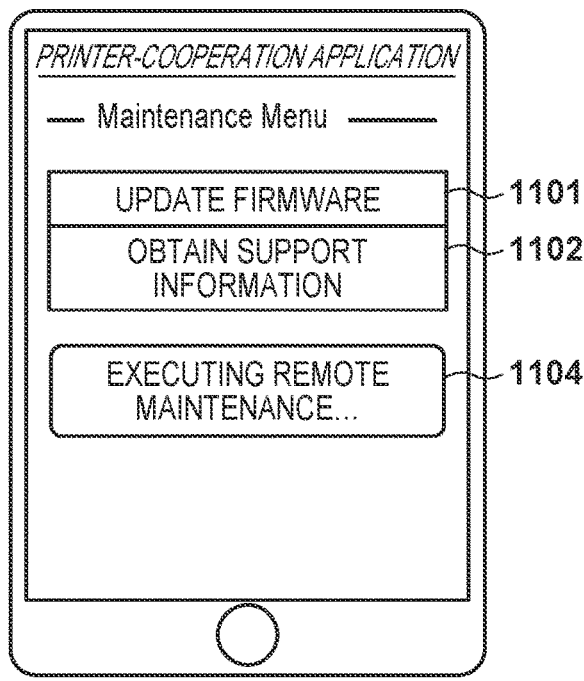
Figure 11B:
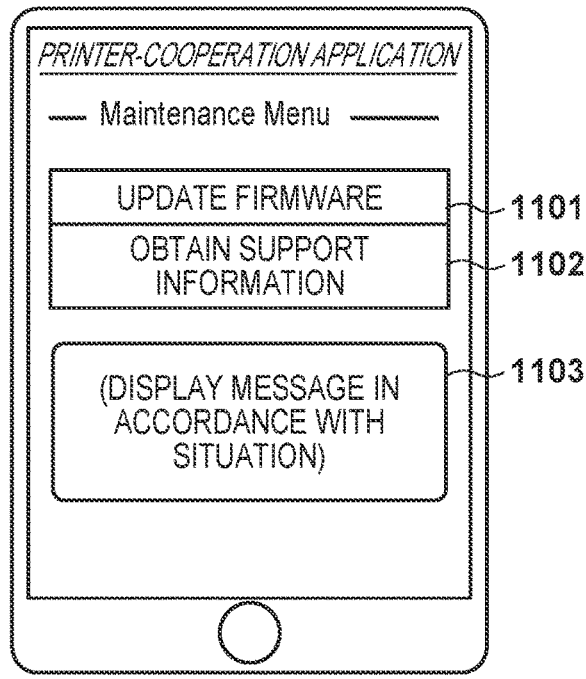
Figure 11D:
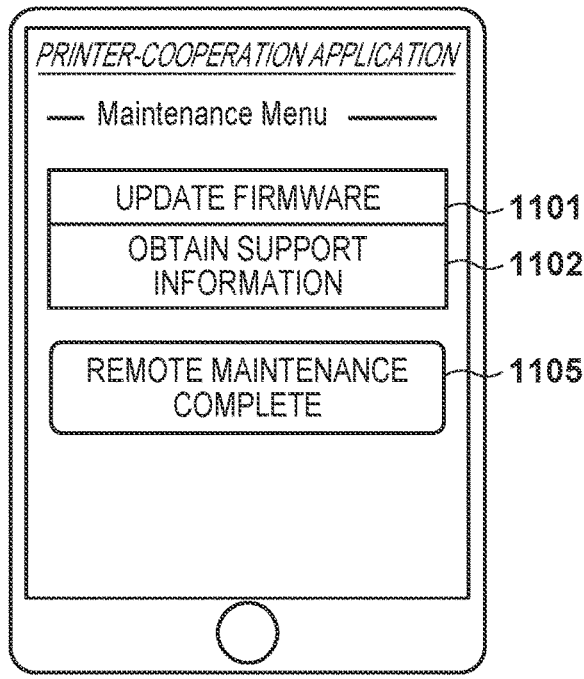

When this processing is started, the smart phone 101 displays, on the display unit 201, a menu screen (e.g. FIG. 9) to prompt a user to select a service to be executed with the printer 102. In the present embodiment, a list of services that the service execution unit 450 of the smart phone 101 has is displayed on the menu screen illustrated in FIG. 9. In FIG. 9, the reference numeral 901 denotes the "print service" of the service execution unit 450. The reference numeral 902 denotes the "remote maintenance service" of the service execution unit 450. In the present embodiment, selection of a service that the smart phone 101 executes with the printer 102 is performed in accordance with a user operation accepted by the operation unit 202 (step S601).

If the service that it is desired that the smart phone 101 executes with the printer 102 is the "print service" (PRINT IMAGE OF SMART PHONE of step S602), the service execution unit 450 of the smart phone 101 performs initiation processing of the print service.

In the initiation processing of the print service, the wireless LAN communication control unit 410 of the smart phone 101 determines the role of the wireless LAN communication to be STA (step S603). Next, thumbnail images displayed on the display unit 201 of the smart phone 101 (reference numerals 1001 and 1003 of FIGS. 10A-10E) are selected by a user operating the operation unit 202 (step S604). Similarly, in accordance with an operation to print images selected by operating the operation unit 202 (a user touching reference numeral 1004 of FIGS. 10A-10E) being executed, the NFC communication control unit 430 of the smart phone 101 performs NFC handover processing (step S607). In other words, NFC is used to request the printer 102 to start communication by wireless LAN.

Note that, in the present embodiment, the smart phone 101 is configured so that it cannot execute the print operation if a thumbnail image displayed on the display unit 201 of the smart phone 101 is not selected by a user (inactivation of the reference number 1002 of FIGS. 10A-10E).

In contrast, if the service that it is desired that the smart phone 101 executes with the printer 102 is the "remote maintenance service" (MAINTENANCE of step S602), the service execution unit 450 of the smart phone 101 performs initiation processing of the remote maintenance service.

In the initiation processing of the remote maintenance service, the wireless LAN communication control unit 410 of the smart phone 101 determines the role of the wireless LAN communication to be AP (step S605). Next, the smart phone 101 displays remote maintenance items (reference numerals 1101 and 1102 of FIGS. 11A-11D) on the display unit 201.

In the present embodiment, selection of a remote maintenance item that the smart phone 101 executes with the printer 102 is performed in accordance with a user operation accepted by the operation unit 202 (step S606).

In accordance with a user selecting a remote maintenance item, the smart phone 101 displays, on the display unit 201, a message (reference numeral 1201 of FIG. 12) for prompting a user to cause the smart phone 101 to approach the printer 102. When the user causes the smart phone 101 to approach the printer 102, the NFC communication control unit 430 of the smart phone 101 performs NFC handover processing (step S607). In other words, NFC is used to request the printer 102 to start communication by wireless LAN.

The NFC handover processing of step S607 is explained in detail below. When the NFC communication control unit 430 of the smart phone 101 detects that it is in a proximity of the NFC communication unit 311 of the printer 102, the NFC handover processing establishes communication by NFC with the printer 102. Next, the NFC communication control unit 430 of the smart phone 101 transmits an NFC handover request to the printer 102.

The NFC handover request includes, as an identifier of the smart phone 101, at least one of a BD_ADDR, a MAC address, and an SSID of the smart phone 101. Similarly, the NFC handover request includes, as role information of the smart phone 101, information that represents AP or STA. Furthermore, if the role information of the smart phone 101 is AP, the NFC handover request includes, as a wireless LAN connection parameter of the smart phone, at least one of the SSID, an encryption key, an encryption method, an authentication key, an authentication method, and the MAC address.

Next, the NFC communication control unit 430 of the smart phone 101 receives response information (a response) corresponding to the NFC handover request from the printer 102. The NFC communication control unit 430 of the smart phone 101 stores the response information in the RAM 207.

The response information corresponding to the NFC handover request includes, as an identifier of the NFC handover, an identifier of the printer 102. Similarly, the information of the response to the NFC handover request includes, as an NFC handover result of the printer 102, information that expresses success or failure.

Furthermore, if the NFC handover result of the printer 102 is information expressing failure, the response information corresponding to the NFC handover request includes, as a type of failure, information expressing that connection will be possible later or that connection is impossible. Further, if the role information of the printer 102 is AP, the response information corresponding to the NFC handover request includes, as a wireless LAN connection parameter of the printer 102, at least one of an SSID, an encryption key, an encryption method, an authentication key, an authentication method, and a MAC address.

Further, if it possible to obtain information of a scheduled time for the termination of a connection with the other communication apparatus 105 that the printer 102 is connected to, the information of the response to the NFC handover request includes, as a job termination time of the printer, the scheduled time information.

When the NFC handover processing (step S607) completes, the printer-cooperation processing continuation determination unit 440 of the smart phone 101 determines the success/failure of the NFC handover processing based on the information of the response to the NFC handover request (step S608).

If it is determined that the NFC handover processing failed (NO in step S608), the printer-cooperation processing continuation determination unit 440 of the smart phone 101 performs processing for analyzing the response information received from the printer 102 (step S609).

Figure 6B:
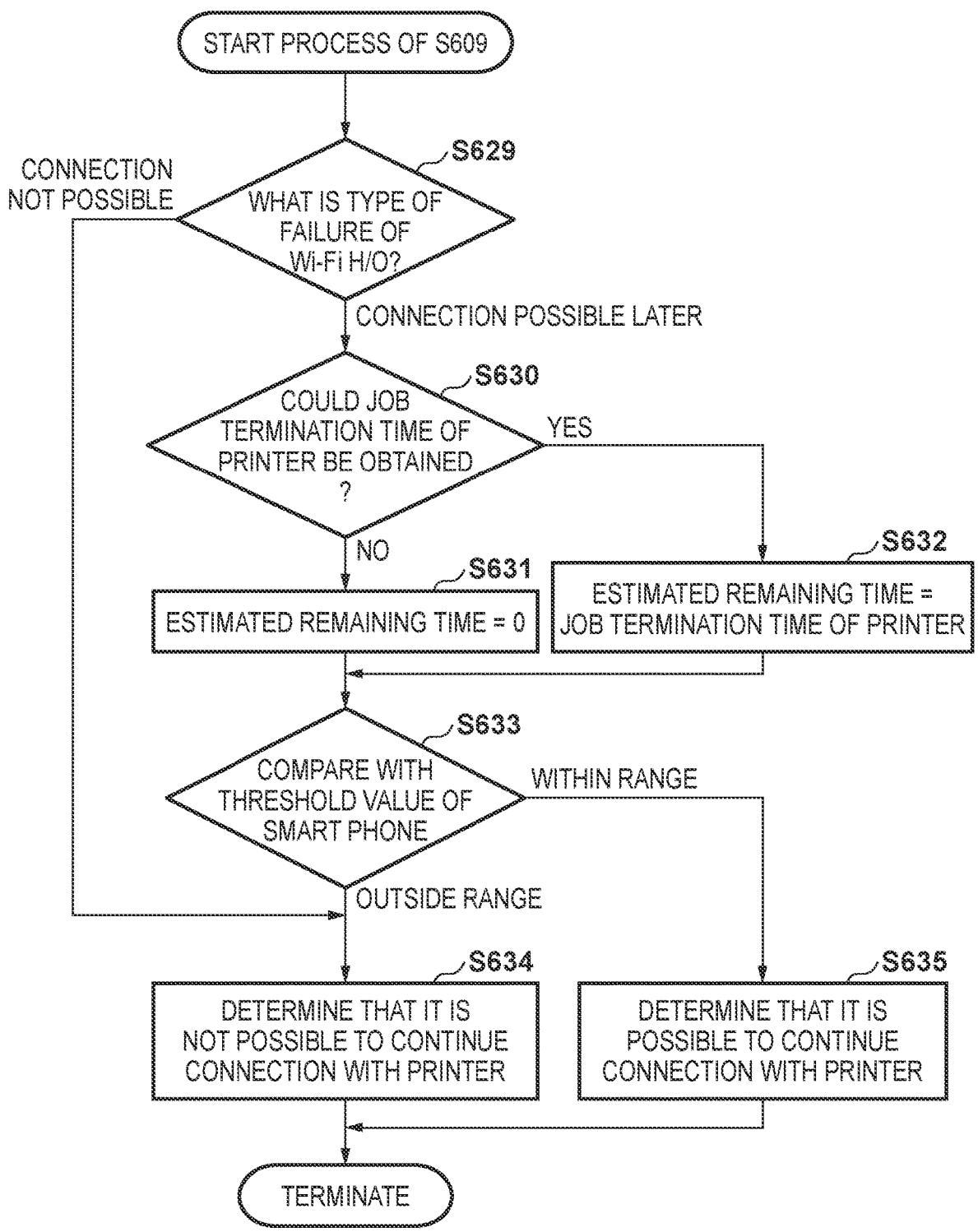

Here, FIG. 6B is a flowchart that illustrates in detail the processing for analyzing of the response information (step S609). In the processing for analyzing the response information, whether to continue the connection with the printer 102 is determined based on the response information corresponding to the NFC handover request. Firstly, the printer-cooperation processing continuation determination unit 440 determines the type of failure of the NFC handover from the response information (step S629).

In step S629, if the type of failure of the NFC handover is determined to indicate "continuation impossible" ("CONNECTION IMPOSSIBLE" in step S629), the printer-cooperation processing continuation determination unit 440 of the smart phone 101 determines that it is impossible to continue the connection with the printer 102 (step S634).

In step S629, if the type of failure of the NFC handover is determined to indicate that "continuation will be possible later" ("CONNECTION POSSIBLE LATER" in step S629), the printer-cooperation processing continuation determination unit 440 of the smart phone 101 calculates an estimated remaining time (step S630 to step S632). The estimated remaining time is a time period until it will be possible to connect to the printer 102, from the job termination time of the printer included in the response information.

More specifically, the printer-cooperation processing continuation determination unit 440 determines whether printer job termination time information of the response information could be obtained (step S630). If the printer job termination time information of the response information could not be obtained (NO in step S630), an estimated remaining time is set to 0 (step S631). On the other hand, if the printer job termination time information of the response information could be obtained (YES in step S630), an estimated remaining time is set to the job termination time of the printer (step S632).

Next, a comparison between the estimated remaining time until a connection with the printer 102 is possible is compared with a threshold value of the smart phone 101 (step S633); if the estimated remaining time until a connection with the printer 102 is possible is outside a range of the threshold value of the smart phone 101 ("OUTSIDE RANGE" in step S633), the printer-cooperation processing continuation determination unit 440 of the smart phone 101 determines that it is not possible to continue the connection with the printer 102 (step S634). However, if the estimated remaining time until connection with the printer 102 is possible is within the range of the threshold value of the smart phone 101 ("WITHIN RANGE" in step S633), the printer-cooperation processing continuation determination unit 440 of the smart phone 101 determines that it is possible to continue the connection with the printer 102 (step S635). Thereafter the processing of step S609 is advanced to step S610.

Note that, in the present embodiment, the smart phone 101 compared the job termination time of the printer 102 with the threshold value of the smart phone 101 and performed the determination of whether it is possible to continue the connection with the printer 102, but configuration may be taken to pass the threshold value of the smart phone 101 to the printer 102 and perform the determination of whether it is possible to continue the connection in the printer 102.

Next, in the processing for analyzing the response information, if it is determined that it is not possible to continue the connection with the printer 102 ("CONTINUING CONNECTION WITH PRINTER NOT POSSIBLE" in step S610), the smart phone 101 performs display control that causes an error message (reference numeral 1209 in FIG. 12) to be displayed on the display unit 201 (step S611). Next, the smart phone 101 discards the response information stored in the RAM 207 (step S612). The BLE communication control unit 420 of the smart phone 101 disconnects the communication by BLE (step S613), and the processing of FIG. 6A-1, 6A-2 terminates.

Meanwhile, in the processing for analyzing the response information, if it is determined that it is possible to continue the connection with the printer 102 ("CONTINUING CONNECTION WITH PRINTER POSSIBLE" in step S610), the printer-cooperation processing continuation determination unit 440 of the smart phone 101 performs printer connection wait processing. In the printer connection wait processing, the BLE communication control unit 420 of the smart phone 101 establishes communication with the printer 102 in accordance with BLE (step S614). Next, the BLE communication control unit 420 of the smart phone 101 determines whether a connection availability notification has been received from the printer 102 in accordance with BLE (step S615).

If connection with the printer 102 is determined to be impossible in the determination of step S615 ("IMPOSSIBLE" or "BLE DISCONNECT" in step S615), the smart phone 101 performs the processing of step S611 to step S613, and the processing of FIG. 6A-1, 6A-2 terminates.

Note that the determination that connection is impossible in step S615 includes a case in which a connection impossible notification is received from the printer 102 by BLE. Furthermore, the determination that connection is impossible of step S615 includes a case of detecting that communication in accordance with BLE between the smart phone 101 and the printer 102 has been disconnected.

If it is determined in the determination of step S615 that a notification from the printer 102 has not been received ("DOES NOT EXIST" in step S615), the smart phone 101 displays, on the display unit 201, a message (reference number 1202 of FIG. 12) prompting a user to select whether or not to continue connecting to the printer 102 (step S616). Selection is accepted from a user who viewed this message.

Figure 12:
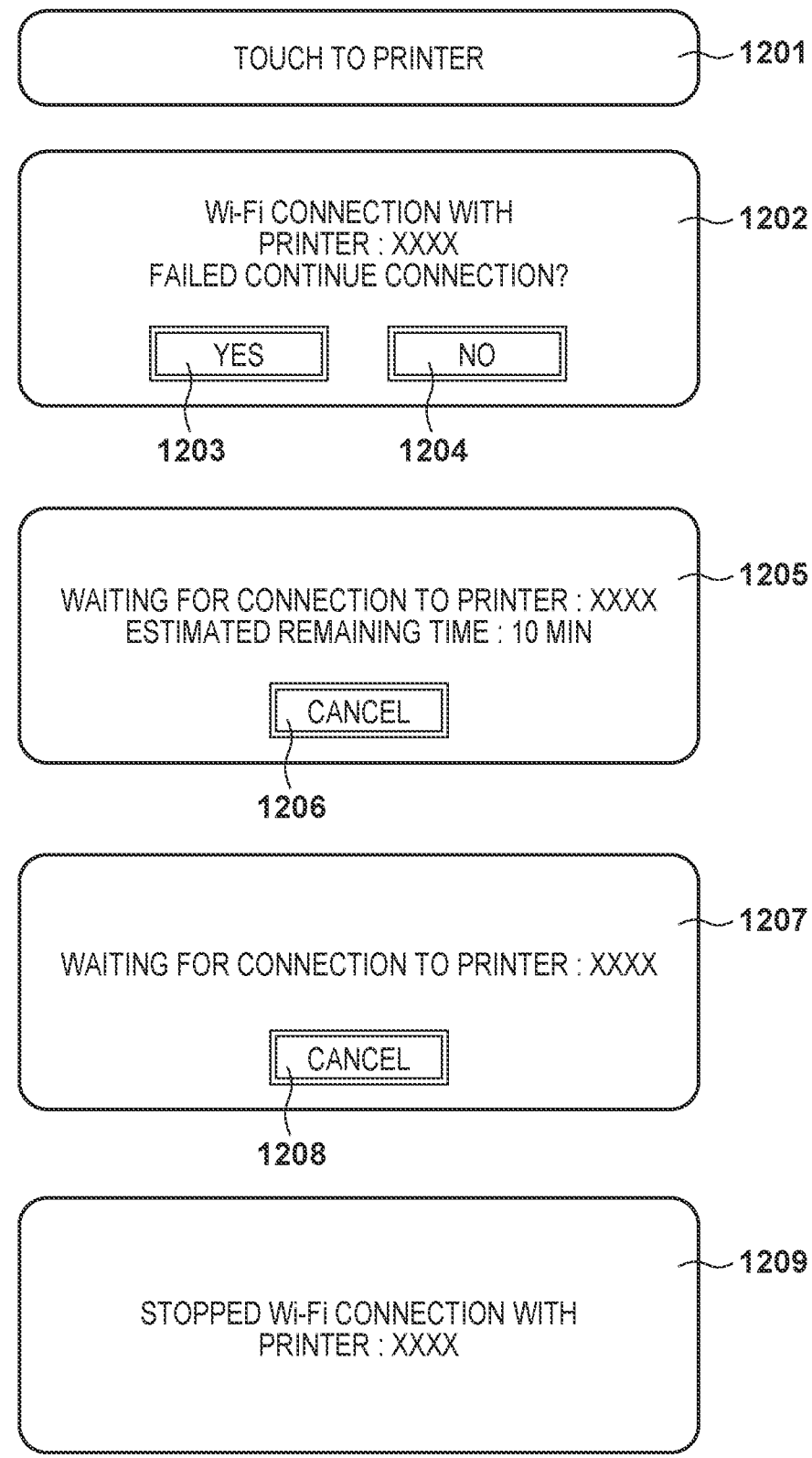
FIG. 12 is a view for illustrating examples of message display screens of the printer-cooperation processing of the communication apparatus (the smart phone) according to an embodiment of the present invention.

In the present embodiment, by a user touching a reference numeral 1203 in a screen of reference numeral 1202 in FIG. 12, the smart phone 101 determines that continuing the connection with the printer 102 has been selected. Also, by a user touching a reference numeral 1204 in a screen of reference numeral 1202 in FIG. 12, the smart phone 101 determines that terminating the connection with the printer 102 has been selected. In the present embodiment, selection of whether or not the smart phone 101 continues the connection to the printer 102 is performed in accordance with a user operation accepted by the operation unit 202.

The smart phone 101 determines an operation by a user with respect to the message for selecting whether to continue connecting to the printer 102 (step S617). In the determination of step S617, if it is determined that there is no operation by a user ("NO OPERATION" in step S617), the smart phone 101 performs the processing of step S615 again. In contrast, in the determination of step S617, if it is determined that terminating the connection with the printer 102 is selected ("SELECTION TO NOT CONTINUE" in step S617), the BLE communication control unit 420 of the smart phone 101 uses BLE to transmit a termination notification for the NFC handover to the printer 102 (step S618).

Next, the smart phone 101 executes the processing of step S612 and step S613, and the processing of FIG. 6A-1, 6A-2 terminates.

In contrast, in the determination of step S617, if it is determined that continuing the connection with the printer 102 is selected ("SELECTING TO CONTINUE" in step S617), the BLE communication control unit 420 of the smart phone 101 uses BLE to determine whether a connection availability notification has been received from the printer 102 (step S619).

If connection with the printer 102 is determined to be impossible in the determination of step S619 ("IMPOSSIBLE" or "BLE DISCONNECT" in step S619), the smart phone 101 performs the processing of step S611 to step S613, and the processing of FIG. 6A-1, 6A-2 terminates.

Note that the determination that connection is impossible in step S619 includes a case in which a connection impossible notification is received from the printer 102 by BLE. Furthermore, the determination that connection is impossible of step S619 includes a case of detecting that communication by BLE between the smart phone 101 and the printer 102 has been disconnected.

Meanwhile, if it is determined in the determination of step S619 that a notification from the printer 102 has not been received ("DOES NOT EXIST" in step S619), the smart phone 101 displays, on the display unit 201, a connection availability notification wait message of the printer 102 (reference numbers 1205 and 1207 of FIG. 12) (step S621, step S622).

In the present embodiment, if the estimated remaining time obtained in step S609 is 0 ("=0" in step S620), a connection availability notification wait message of the printer 102 displays, on the display unit 201 of the smart phone 101, a message such as that illustrated by reference numeral 1207 in FIG. 12 (step S621).

Meanwhile, if the estimated remaining time obtained in step S609 is 0 ("≠0" in step S620), a connection availability notification wait message of the printer 102 displays, on the display unit 201 of the smart phone 101, a message such as that illustrated by reference numeral 1205 in FIG. 12 (step S622) in addition to an estimated remaining time. The estimated remaining time is decremented in accordance with an elapsed time and displayed on the display unit 201 (step S623).

With respect to the connection availability notification wait message of the printer 102, if there is no operation by a user ("NO OPERATION" in step S624), the smart phone 101 performs the processing of step S619 again. With respect to the connection availability notification wait message of the printer 102, if a user selected a connection wait cancel with respect to the printer 102 ("WAIT CANCEL SELECTION" in step S624), the smart phone 101 executes the processing of step S618, step S612, and step S613, and the processing of FIG. 6A-1, 6A-2 terminates. Note that the so-called connection wait cancel is an operation in which a user touches a reference numeral 1206 or a reference numeral 1208 in FIG. 12 that are displayed on the operation unit 202.

In the determination of step S615 or step S619, if a notification that connection is possible is received from the printer 102 ("POSSIBLE" in step S615, or "POSSIBLE" in step S619), the BLE communication control unit 420 of the smart phone 101 uses BLE to transmit an NFC handover continuation notification to the printer 102 (step S625).

Continuing on, the BLE communication control unit 420 of the smart phone 101 disconnects the communication in accordance with BLE (step S626). Next, the service execution unit 450 of the smart phone 101 executes service processing with the printer 102 according to the wireless LAN communication (step S627), and the processing of FIG. 6A-1, 6A-2 terminates.

If it is determined that the NFC handover processing succeeded (YES in step S608), the smart phone 101 performs the processing of step S628, and the processing of FIG. 6A-1, 6A-2 terminates. Step S628 is the same as the processing of step S627.

Figure 6C:
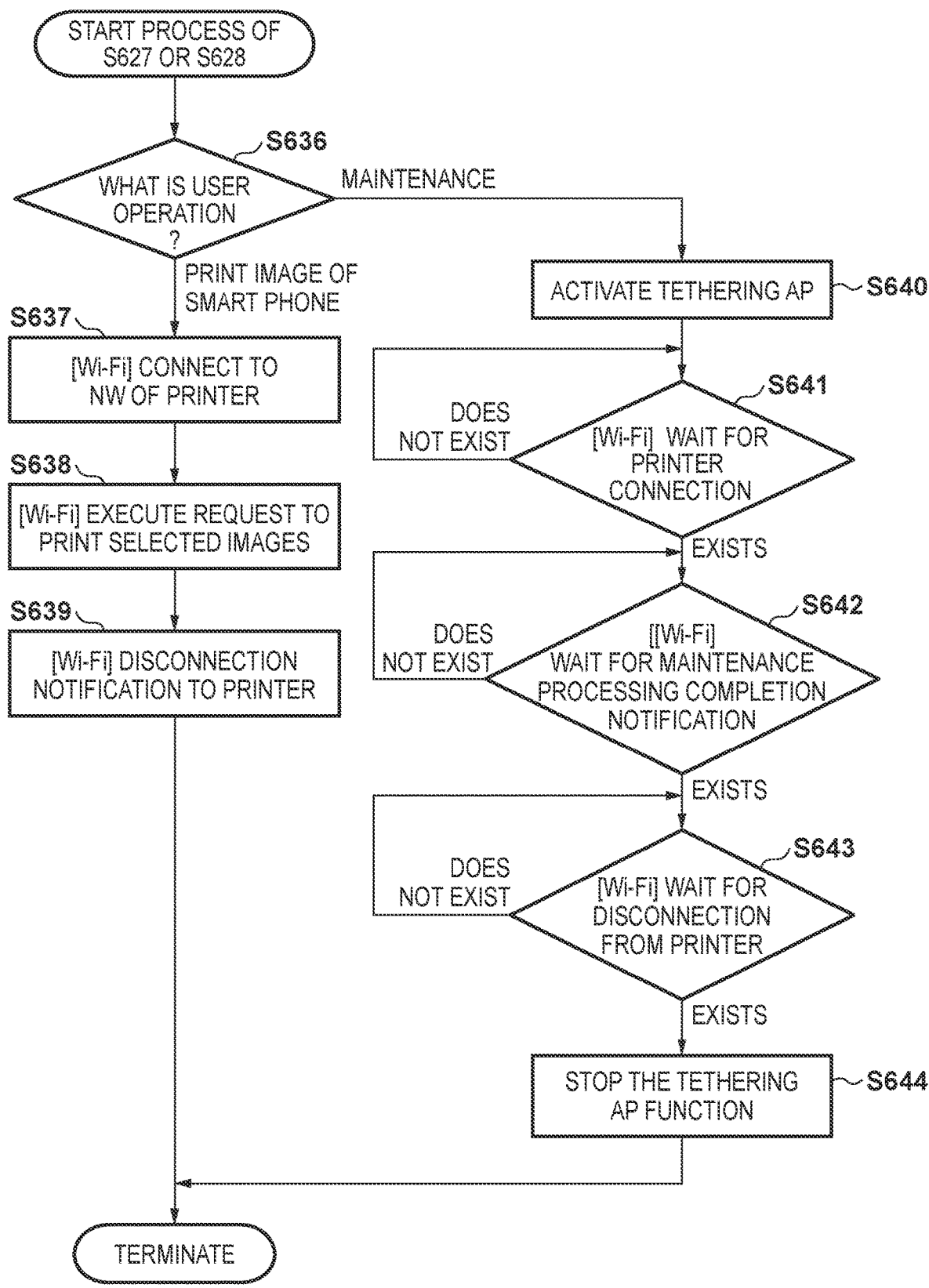

Here, FIG. 6C is a flowchart that illustrates in detail the service processing of step S627 and step S628. The service processing branches in accordance with the service selected in step S602. If the service selected in step S602 is the print service ("PRINT IMAGE OF SMART PHONE" in step S636), the wireless LAN communication control unit 410 of the smart phone 101 connects to a wireless LAN network that the printer 102 creates (step S637).

Next, the service execution unit 450 of the smart phone 101 uses the wireless LAN communication to transmit a request to print the selected images to the printer 102 (step S638). In the present embodiment, when the service execution unit 450 of the smart phone 101 starts transmission of the print request, the smart phone 101 displays, on the display unit 201, a message indicating that the print service is in progress (reference numeral 1006 of FIGS. 10A-10E).

In the present embodiment, when the service execution unit 450 of the smart phone 101 completes transmission of the print request, the smart phone 101 displays on the display unit 201 a message (reference numeral 1007 in FIGS. 10A-10E) indicating print service completion.

When transmission of the print request for the selected images completes, the wireless LAN communication control unit 410 of the smart phone 101 uses the wireless LAN communication to transmit to the printer 102 a notification of disconnection from the wireless LAN network (step S639).

However, if the service selected in step S602 is the remote maintenance service ("MAINTENANCE" in step S636), the wireless LAN communication control unit 410 of the smart phone 101 uses the wireless LAN communication unit 208 and the public wireless communication unit 211 to activate the tethering AP function (step S640). Next, the wireless LAN communication control unit 410 of the smart phone 101 establishes a connection with the printer 102 (step S641).

Note that, in the present embodiment, the smart phone 101 activates the tethering AP function in accordance with receiving from the printer 102 using BLE the notification that connection to the printer is possible, but the tethering AP may be activated in advance considering an activation time for the AP from the estimated remaining time.

More specifically, configuration may be taken to activate the tethering AP after a scheduled time that the smart phone 101 obtained from the printer 102 in step S607 has passed. In addition, configuration may be taken to consider time taken for the wireless LAN communication control unit 410 to activate the tethering AP, and to activate the tethering AP when a time period obtained by subtracting the tethering AP activation time from the scheduled time obtained from the printer 102 has passed.

When establishment of the connection with the printer 102 completes ("EXISTS" in step S641), the service execution unit 450 of the smart phone 101 waits until the wireless LAN communication is used to receive a maintenance processing completion notification from the printer 102 (step S642).

In the present embodiment, until the service execution unit 450 of the smart phone 101 receives the maintenance processing completion notification, the smart phone 101 displays on the display unit 201 a message (reference numeral 1104 in FIGS. 11A-11D) indicating that the print service is in progress.

In the present embodiment, when the service execution unit 450 of the smart phone 101 completes transmission of the print request, the smart phone 101 displays on the display unit 201 a message (reference numeral 1105 in FIGS. 11A-11D) indicating print service completion.

When the maintenance processing completion notification is received from the printer 102 ("EXISTS" in step S642), the wireless LAN communication control unit 410 of the smart phone 101 disconnects the connection with the printer 102 (step S643) and stops the tethering AP function (step S644).

Note that, in the above-described explanation, each message illustrated in FIG. 12 is displayed in a region of reference numeral 1103 in FIGS. 11A-11D or reference numeral 1005 in FIGS. 10A-10E, which are displayed on the display unit 201 of the smart phone 101.

<5. Operation Example of Printer 102>

Figure 7A:
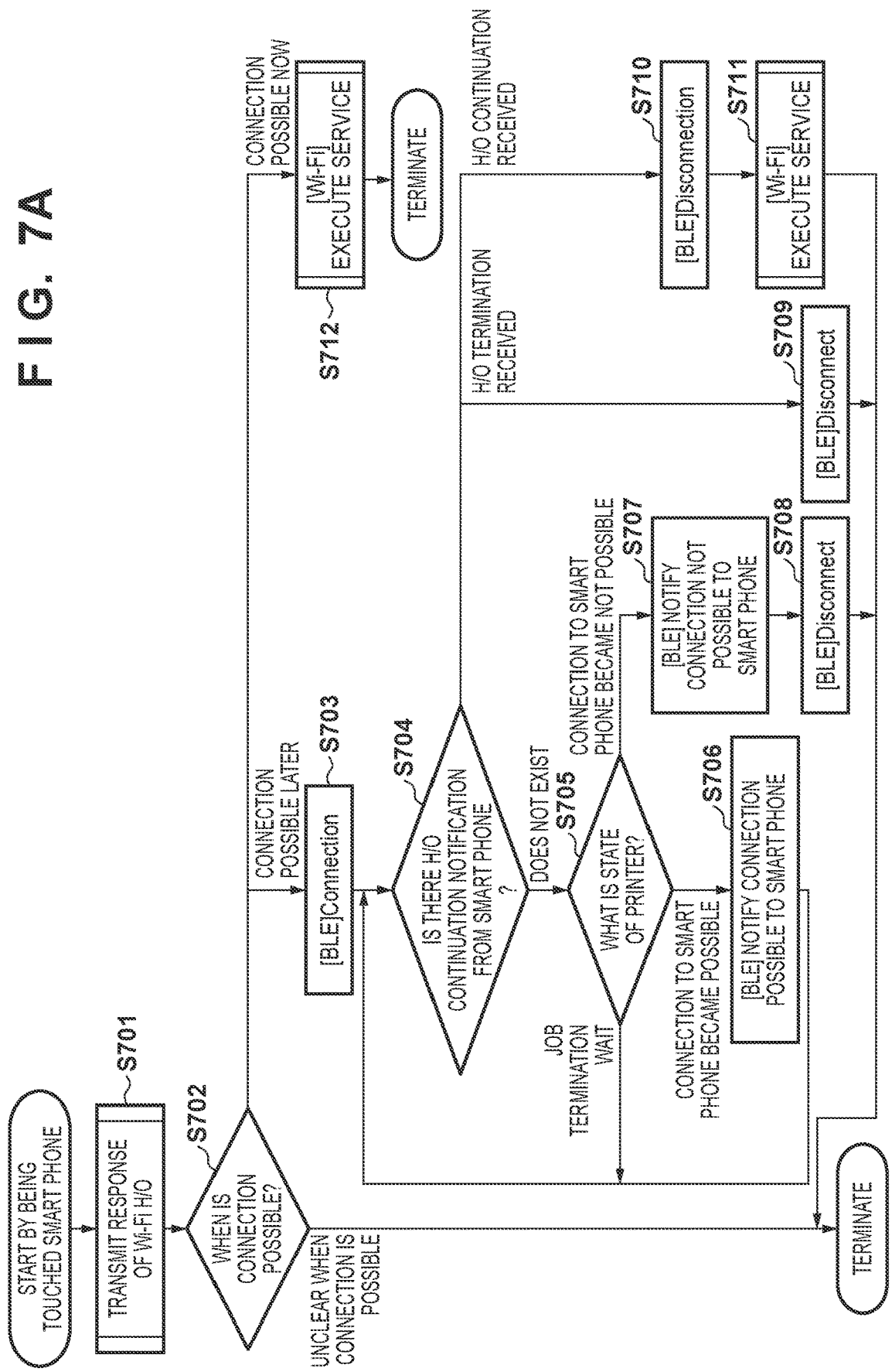
FIG. 7A to FIG. 7C are flowcharts illustrating a procedure of cooperative processing that the communication apparatus (the smart phone) performs with the external communication apparatus (the printer) according to an embodiment of the present invention.
Figure 7B:
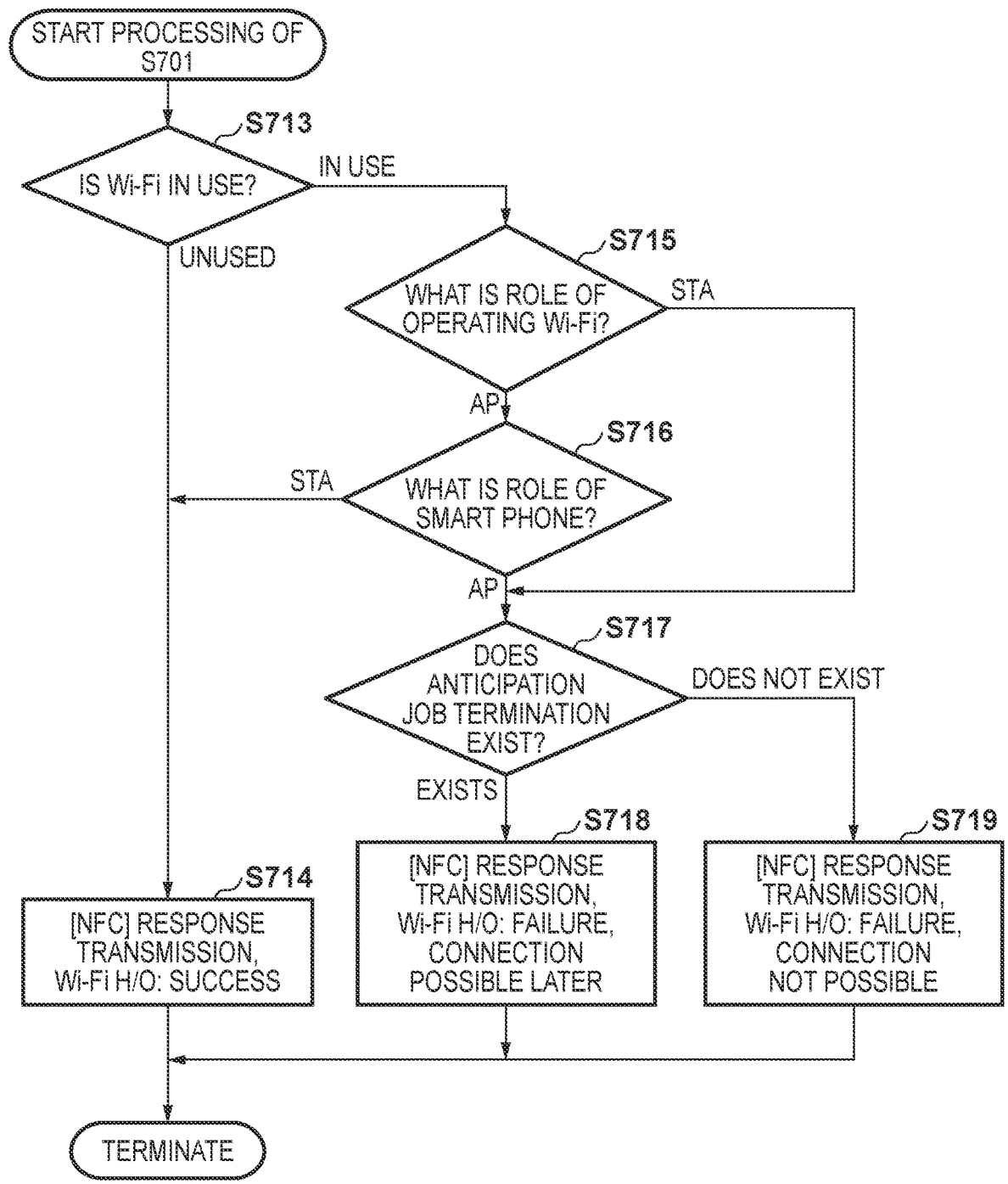
Figure 7C:
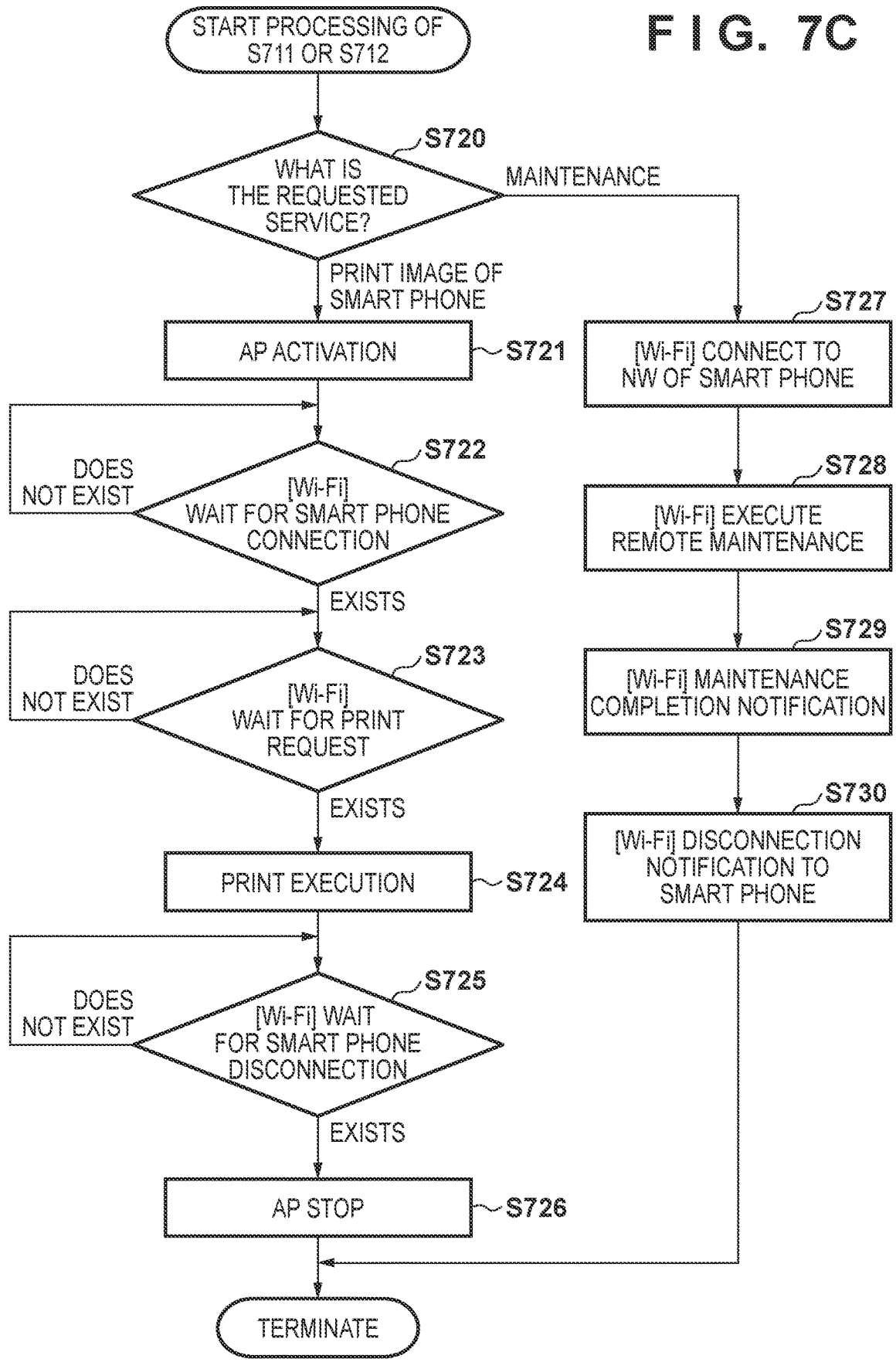

Next, explanation is given for the operational procedure of the external communication apparatus (the printer 102) according to the present embodiment, with reference to the flowcharts of FIG. 7A to FIG. 7C. The flowcharts of FIG. 7A to FIG. 7C illustrate an operational procedure for when the printer 102 performs the smart phone-cooperation processing.

When the NFC communication control unit 530 of the printer 102 detects that it is in a proximity of the NFC communication unit 210 of the smart phone 101, this processing in FIG. 7A is started by communication by NFC with the smart phone 101 being established. Upon starting this processing, the printer 102 executes processing for transmitting information of a response to an NFC handover request received from the smart phone 101, based on a usage condition of the wireless LAN communication function (step S701).

Here, FIG. 7B is a flowchart that illustrates in detail the processing for transmitting the information of the response to the NFC handover request (step S701). In the response transmission processing, the smart phone-cooperation continuation determination unit 540 of the printer 102 determines whether the printer 102 is using the wireless LAN communication function (step S713). If the printer 102 is not using the wireless LAN communication function ("UNUSED" in step S713), the smart phone-cooperation continuation determination unit 540 of the printer 102 determines the NFC handover result to be success (step S714). If the printer 102 is using the wireless LAN communication function ("IN USE" in step S713), the wireless LAN communication control unit 510 of the printer 102 determines a role of the wireless LAN communication that is operating in the printer 102 (step S715).

If the role of the wireless LAN communication operating in the printer 102 is AP ("AP" in step S715), the smart phone-cooperation continuation determination unit 540 of the printer 102 determines a role of the wireless LAN communication of the smart phone 101 by the NFC handover request (step S716).

If the role of the wireless LAN communication of the smart phone 101 is STA ("STA" in step S716), the printer 102 executes the processing of step S714. However, if the role of the wireless LAN communication of the smart phone 101 is AP ("AP" in step S716), the wireless LAN communication control unit 510 of the printer 102 determines an anticipation of a termination of a wireless LAN communication job (step S717).

If termination of the wireless LAN communication job is anticipated ("EXISTS" in step S717), the smart phone-cooperation continuation determination unit 540 of the printer 102 determines the NFC handover result to be failure, and determines the failure type of the NFC handover result to be that later connection is possible (step S718).

If termination of the wireless LAN communication job is not anticipated ("DOES NOT EXIST" in step S717), the smart phone-cooperation continuation determination unit 540 of the printer 102 determines the NFC handover result to be failure, and determines the failure type of the NFC handover result to be that later connection is not possible (step S719).

Meanwhile, if the role of the wireless LAN communication operating on the printer 102 is STA ("STA" in step S715), the printer 102 executes the processing of step S717.

Next, the NFC communication control unit 530 of the printer 102 uses NFC to transmit, as the response information, the NFC handover result and the type of the failure of the NFC handover result to the smart phone 101 (step S714, step S718, and step S719). Thus the processing of FIG. 7B terminates.

Returning to FIG. 7A, in step S701, if response information indicating that when the printer 102 can connect is unclear is transmitted to the smart phone 101 ("UNCLEAR WHEN CONNECTION IS POSSIBLE" in step S702), the printer 102 terminates the processing of FIG. 7A.

In step S701, if response information indicating that the printer 102 can connect later is transmitted to the smart phone 101 ("CONNECTION POSSIBLE LATER" in step S702), the BLE communication control unit 520 of the printer 102 establishes communication according to BLE with the smart phone 101 (step S703).

Next, the smart phone-cooperation continuation determination unit 540 of the printer 102 determines whether or not an NFC handover continuation notification has been received from the smart phone 101 (step S704). If an NFC handover continuation notification from the smart phone 101 is not received ("NO" in step S704), the smart phone-cooperation continuation determination unit 540 of the printer 102 monitors a wireless LAN communication state of the printer 102 (step S705).

In the determination of step S705, if it is determined that the state of the printer 102 that it is waiting for the job to terminate ("JOB TERMINATION WAIT" in step S705), the smart phone-cooperation continuation determination unit 540 of the printer 102 performs the processing of step S704 again.

In the determination of step S705, if it is determined that the state of the printer 102 is that connection to the smart phone 101 became possible ("CONNECTION TO SMART PHONE BECAME POSSIBLE" in step S705), the smart phone-cooperation continuation determination unit 540 of the printer 102 uses BLE to transmit a connection possible notification to the smart phone 101 (step S706). Next, the smart phone-cooperation continuation determination unit 540 of the printer 102 performs the processing of step S704 again.

In the determination of step S705, if it is determined that the state of the printer 102 is that connection to the smart phone 101 became not possible ("CONNECTION TO SMART PHONE BECAME NOT POSSIBLE" in step S705), the smart phone-cooperation continuation determination unit 540 of the printer 102 uses BLE to transmit a connection not possible notification to the smart phone 101 (step S707). Continuing on, the BLE communication control unit 520 of the printer 102 disconnects the communication by BLE (step S708), and the processing of FIG. 7A terminates.

Meanwhile, if an NFC handover termination notification is received as an NFC handover continuation notification from the smart phone 101 ("H/O TERMINATION RECEIVED" in step S704), the BLE communication control unit 520 of the printer 102 disconnects the communication according to BLE (step S709), and the processing of FIG. 7A terminates.

Meanwhile, if an NFC handover continuation notification is received as an NFC handover continuation notification from the smart phone 101 ("H/O CONTINUATION RECEIVED" in step S704), the BLE communication control unit 520 of the printer 102 disconnects the communication according to BLE (step S710). Next, the service control unit 550 of the printer 102 executes service processing with the smart phone 101 according to the wireless LAN communication (step S711), and the processing of FIG. 7A terminates.

Here, FIG. 7C is a flowchart that illustrates in detail the service processing (step S711). In the service processing, the service control unit 550 of the printer 102 determines the type of the service based on the NFC handover request received from the smart phone 101 (step S720).

If the requested service is the print service ("PRINT IMAGE OF SMART PHONE" in step S720), the wireless LAN communication control unit 510 of the printer 102 uses the wireless LAN communication unit 309 to activate the AP function (step S721). Next, the wireless LAN communication control unit 5100 of the printer 102 establishes a connection with the smart phone 101 (step S722).

After completion of establishment of the connection with the smart phone 101 ("EXISTS" in step S722), the service control unit 550 of the printer 102 uses the wireless LAN communication to wait until a print request is received from the smart phone 101 (step S723).

If a print request is received from the smart phone 101 ("EXISTS" in step S723), the service control unit 550 of the printer 102 uses the print control unit 560 to execute print processing (step S724). When the print processing completes, the wireless LAN communication control unit 510 of the printer 102 disconnects the connection with the smart phone 101 ("EXISTS" in step S725), and stops the AP function (step S726).

In contrast, if the requested service is the remote maintenance service ("MAINTENANCE" in step S720), the wireless LAN communication control unit 510 of the printer 102 connects to a wireless LAN network that the smart phone 101 creates (step S727).

Next, the service control unit 550 of the printer 102 uses the wireless LAN communication to perform remote maintenance processing (step S728). When the remote maintenance processing completes, the wireless LAN communication control unit 510 of the printer 102 uses the wireless LAN communication to transmit a remote maintenance completion notification to the smart phone 101 (step S729). Next, the wireless LAN communication control unit 510 of the printer 102 uses the wireless LAN communication to transmit a notification of disconnection from the wireless LAN network to the smart phone 101 (step S730). The foregoing processing of FIG. 7C then terminates.

Returning to FIG. 7A, in step S701, if response information indicating that the printer 102 can connect now is transmitted to the smart phone 101 ("CONNECTION POSSIBLE NOW" in step S702), the printer 102 executes the service processing with the smart phone 101 (step S712), and terminates the processing of FIG. 7A. Step S712 is the same as the processing of step S711.

<6. Processing Sequence Between Smart Phone 101 and Printer 102>

Figure 8:
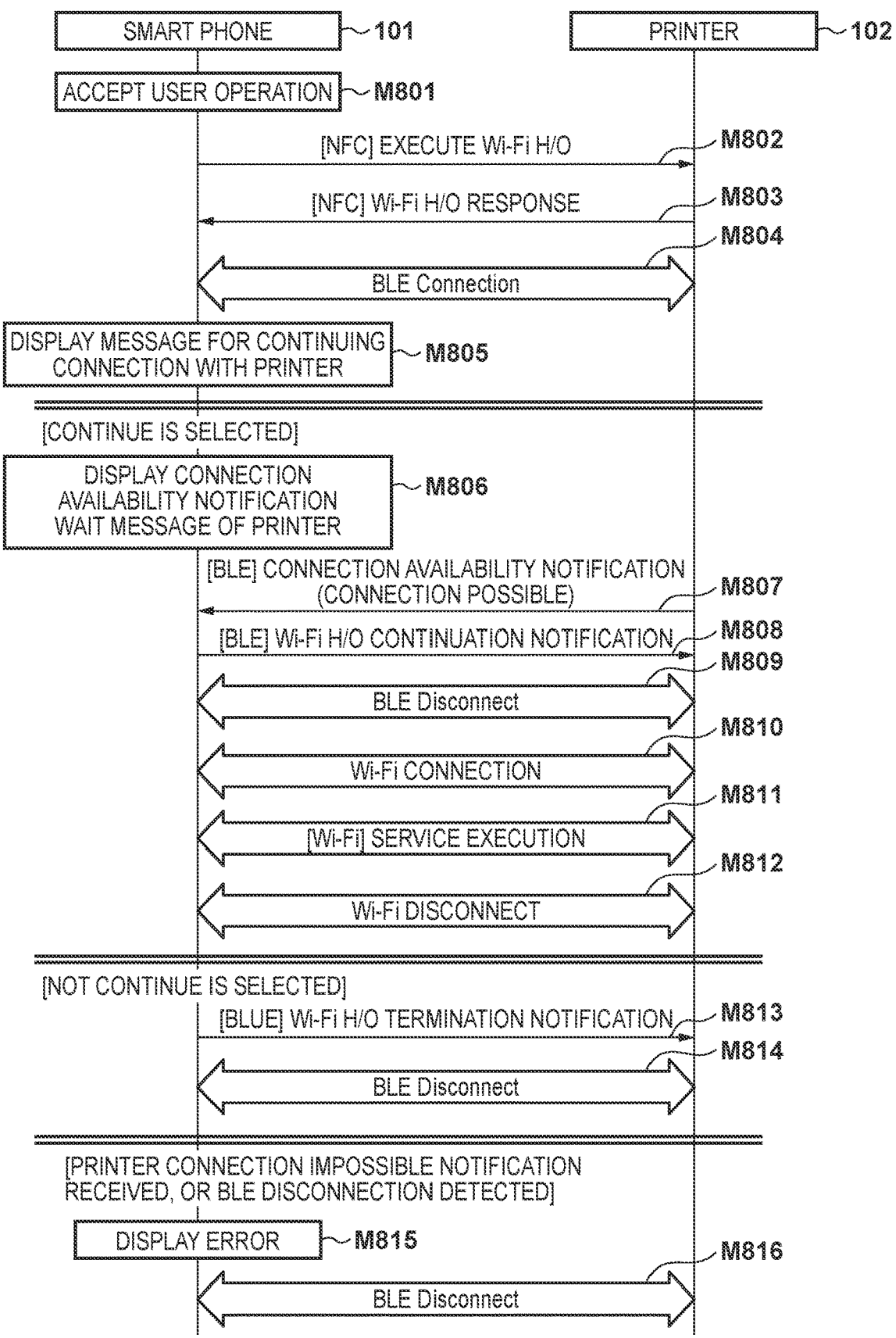
FIG. 8 is a sequence diagram of printer-cooperation processing and smart phone-cooperation processing according to an embodiment of the present invention.

Explanation is given below, with reference to a sequence diagram of FIG. 8, regarding an example of a processing sequence between the smart phone 101 and the printer 102 according to the present embodiment, from a device cooperation start until service execution processing.

Firstly, a user activates the printer-cooperation application of the smart phone 101. The user operates the operation unit 202 of the smart phone 101, and selects a service desired to be executed by the printer-cooperation application with the printer 102 (M801).

After selecting the service to be executed with the printer 102, a user causes the NFC communication unit 210 of the smart phone 101 to approach the NFC communication unit 311 of the printer 102, and communication according to NFC is established between the smart phone 101 and the printer 102. The smart phone 101 uses NFC to transmit the NFC handover request to the printer 102 (M802).

In accordance with receiving the NFC handover request from the smart phone 101, the printer 102 uses NFC to transmit response information corresponding to the NFC handover request to the smart phone 101 (M803). Based on the response information, if it is determined that a result of the NFC handover was failure and that a connection with the printer 102 can be continued, the smart phone 101 and the printer 102 establish communication according to BLE (M804).

After establishing communication according to BLE, the smart phone 101 displays on the display unit 201 a message of whether to continue the connection with the printer 102 (M805). If, with respect to the message of M805, a user operates the operation unit 202 of the smart phone 101 and selects to continue the connection with the printer 102, the smart phone 101 displays, on the display unit 201, a message for waiting for a notification of availability of a connection of the printer 102 (M806).

If the printer 102 enters a state in which it can connect to the smart phone 101, the printer 102 transmits in accordance with BLE a connection availability notification (connection possible) to the smart phone 101 (M807).

Next, in accordance with the smart phone 101 receiving in accordance with BLE the connection availability notification from the printer 102, the smart phone 101 transmits in accordance with BLE an NFC handover continuation notification to the printer 102 (M808). The smart phone 101 and the printer 102 disconnect the communication in accordance with BLE (M809).

After completion of disconnection of the communication in accordance with BLE between the smart phone 101 and the printer 102, the smart phone 101 and the printer 102 establish communication in accordance with a wireless LAN (M810). After completion of an establishment of the communication in accordance with wireless LAN between the smart phone 101 and the printer 102, the smart phone 101 and the printer 102 perform the service processing selected in M801 (M811). After completion of the service processing, the smart phone 101 and the printer 102 disconnect the communication in accordance with a wireless LAN (M812).

Meanwhile, if, with respect to the message of M805, a user operates the operation unit 202 of the smart phone 101 and selects to not continue the connection with the printer 102, the smart phone 101 transmits to the printer 102 an NFC handover termination notification in accordance with BLE (M813). Continuing on, the smart phone 101 and the printer 102 disconnect the communication in accordance with BLE (M814).

With respect to the message of M806, if the smart phone 101 has received a connection availability notification (connection impossible) from the printer 102 in accordance with BLE, or it detects that communication in accordance with BLE has been disconnected, it displays an error message on the display unit of the smart phone (M815). Continuing on, the smart phone 101 and the printer 102 disconnect the communication in accordance with BLE (M816).

As explained above, by virtue of the present embodiment, for example by using handover processing, convenience in improved when causing a connection by a desired communication scheme to be made between communication apparatuses (for example, a smart phone and a printer). Specifically, when interrupting processing for a handover to a wireless LAN communication in accordance with NFC, it is possible to interrupt the handover processing in the printer 102 by a user simply operating the smart phone 101. Thereby, because, after the handover processing is interrupted, unnecessary wireless LAN connection processing is not performed in the printer 102, there is an effect of power saving in the printer 102 and a reduction of unnecessary network traffic.

In addition, by virtue of the present embodiment, even if a wireless LAN communication is impossible when the smart phone 101 is caused to approach the printer 102, performing a handover becomes possible when the wireless LAN communication becomes possible without a user performing additional operations. Thereby, it is possible to allow improvement of usability. Furthermore, because the smart phone 101 can activate a tethering AP function when the wireless LAN communication is possible, it is possible to allow power saving in the handover processing as described above.

In this way, by virtue of the present invention, when performing a handover by an NFC touch, if an opposing device cannot perform the handover immediately, by a user operating his own device, it is possible to notify an interruption of the handover to the opposing device. Thereby, a possibility that unnecessary connection processing is executed in the opposing device can be reduced.

By virtue of the present invention, it is possible to reduce unnecessary connection processing between communication apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-000510, filed Jan. 5, 2015, which is hereby incorporated by reference wherein in its entirety.

What is claimed is:

1. A communication apparatus operable as an AP (Access Point) or STA (Station) of a wireless LAN (Local Area Network), the apparatus comprising:
   at least one processor; and
   at least one memory storing code to be executed by the at least one processor, wherein the at least one processor executes the code to
      create a wireless LAN by operating as the AP;
      accept from a user a first instruction for performing printing processing or a second instruction for performing a maintenance service by using a tethering function;
      receive from a printing apparatus, after a direct connection to the printing apparatus by the wireless LAN cannot be established in accordance with a wireless LAN connection request that is transmitted by the communication apparatus to the printing apparatus, by communication in accordance with a predetermined wireless communication, a notification indicating that it is possible to connect to the wireless LAN, wherein the predetermined wireless communication is a wireless communication in which power consumption is lower than a wireless LAN; and
      control to cause the communication apparatus to operate as the STA and connect to the printing apparatus, which operates as the AP, directly via a wireless LAN, in a case where the notification is received from the printing apparatus in a state where the first instruction has been accepted, and to control to cause the communication apparatus to operate as the AP and connect to the printing apparatus, which operates as the STA, directly via the wireless LAN created by the creating, in a case where the notification is received from the printing apparatus in a state where the second instruction has been accepted.

2. The communication apparatus according to claim 1, wherein the processor further executes the code to, if a notification indicating that it is not possible to connect to the wireless LAN is received from the printing apparatus, start a connection with the printing apparatus in accordance with the predetermined wireless communication,
   wherein the processor receives, by communication in accordance with the connection via the predetermined wireless communication, a notification indicating that it is possible to connect to the wireless LAN.

3. The communication apparatus according to claim 1, wherein the processor further executes the code to communicate with the printing apparatus by the wireless LAN that the AP activated by the printing apparatus creates.

4. The communication apparatus according to claim 3, wherein the processor further executes the code to, based on the communication with the printing apparatus by the wireless LAN that the AP activated by the printing apparatus creates, execute a service requested from the printing apparatus.

5. The communication apparatus according to claim 1, wherein
   the predetermined wireless communication is BLE (Bluetooth Low Energy).

6. The communication apparatus according to claim 5, wherein the processor further executes the code to disconnect the connection, in accordance with the BLE, with the printing apparatus after the notification is received from the printing apparatus.

7. The communication apparatus according to claim 1, further comprising a transmitter that transmits the wireless LAN connection request to the printing apparatus.

8. The communication apparatus according to claim 7, wherein the transmitter transmits the request by using NFC (Near Field Communication).

9. A method of controlling a communication apparatus operable as an AP (Access Point) or STA (Station) of a wireless LAN (Local Area Network), the method comprising:
   creating a wireless LAN by operating as the AP;
   accepting from a user a first instruction for performing printing processing or a second instruction for performing a maintenance service by using a tethering function;
   receiving from a printing apparatus, after a direct connection to the printing apparatus by the wireless LAN cannot be established in accordance with a wireless LAN connection request that is transmitted by the communication apparatus to the printing apparatus, by communication in accordance with a predetermined wireless communication, a notification indicating that it is possible to connect to the wireless LAN, wherein the predetermined wireless communication is a wireless communication in which power consumption is lower than a wireless LAN; and
   controlling to cause the communication apparatus to operate as the STA and connect to the printing apparatus, which operates as the AP, directly via a wireless LAN, in a case where the notification is received in the receiving in a state where the first instruction has been accepted in the accepting, and to control to cause the communication apparatus to operate as the AP and connect to the printing apparatus, which operates as the STA, directly via the wireless LAN created in the creating, in a case where the notification is received in the receiving in a state where the second instruction has been accepted in the accepting.

10. A non-transitory computer-readable storage medium storing a computer program for causing a computer to execute a method of controlling a communication apparatus operable as an AP (Access Point) or STA (Station) of a wireless LAN (Local Area Network), the method comprising:

creating a wireless LAN by operating as the AP;

accepting from a user a first instruction for performing printing processing or a second instruction for performing a maintenance service by using a tethering function;

receiving from a printing apparatus, after a direct connection to the printing apparatus by the wireless LAN cannot be established in accordance with a wireless LAN connection request that is transmitted by the communication apparatus to the printing apparatus, by communication in accordance with a predetermined wireless communication, a notification indicating that it is possible to connect to the wireless LAN, wherein the predetermined wireless communication is a wireless communication in which power consumption is lower than a wireless LAN; and controlling to cause the communication apparatus to operate as the STA and connect to the printing apparatus, which operates as the AP, directly via a wireless LAN, in a case where the notification is received in the receiving in a state where the first instruction has been accepted in the accepting, and to control to cause the communication apparatus to operate as the AP and connect to the printing apparatus, which operates as the STA, directly via the wireless LAN created in the creating, in a case where the notification is received in the receiving in a state where the second instruction has been accepted in the accepting.

* * * * *